US012580718B2

(12) United States Patent
Ryu et al.

(10) Patent No.: US 12,580,718 B2
(45) Date of Patent: Mar. 17, 2026

(54) ANCHOR CELL MANAGEMENT PROCEDURE FOR SYNCHRONIZATION SIGNAL BLOCK (SSB)-LESS CARRIER

(71) Applicant: QUALCOMM Incorporated, San Diego, CA (US)

(72) Inventors: Jae Ho Ryu, San Diego, CA (US); Changhwan Park, San Diego, CA (US); Konstantinos Dimou, New York, NY (US); Hari Sankar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 529 days.

(21) Appl. No.: 18/152,631

(22) Filed: Jan. 10, 2023

(65) Prior Publication Data

US 2024/0235798 A1    Jul. 11, 2024

(51) Int. Cl.
| | |
|---|---|
| *H04L 5/00* | (2006.01) |
| *H04B 17/327* | (2015.01) |
| *H04W 24/10* | (2009.01) |
| *H04W 72/23* | (2023.01) |

(52) U.S. Cl.
CPC ......... *H04L 5/0098* (2013.01); *H04B 17/327* (2015.01); *H04W 24/10* (2013.01); *H04W 72/23* (2023.01)

(58) Field of Classification Search
CPC .... H04L 5/0098; H04B 17/327; H04W 72/23; H04W 24/10
See application file for complete search history.

(56) References Cited

U.S. PATENT DOCUMENTS

2025/0008458 A1*    1/2025   Bergström ............ H04W 48/12

* cited by examiner

*Primary Examiner* — Natasha W Cosme
(74) *Attorney, Agent, or Firm* — Harrity & Harrity LLP

(57) ABSTRACT

Various aspects of the present disclosure generally relate to wireless communication. Various aspects relate generally to anchor cell management for a synchronization signal block (SSB)-less secondary cell (SCell). In some aspects, an anchor cell in a different frequency band from an SSB-less SCell may be used for downlink beam management of the SSB-less SCell. A UE may report, to a network node, reference signal received power (RSRP) measurements for a plurality of downlink reference signals transmitted via the anchor cell, and the network node may determine a downlink beam for the SSB-less SCell based at least in part on the RSRP measurements. The UE may receive a configuration of the SSB-less SCell, and the configuration may indicate the anchor cell associated with the SSB-less SCell. The UE may receive an activation indication that activates the SSB-less SCell for the UE.

30 Claims, 12 Drawing Sheets

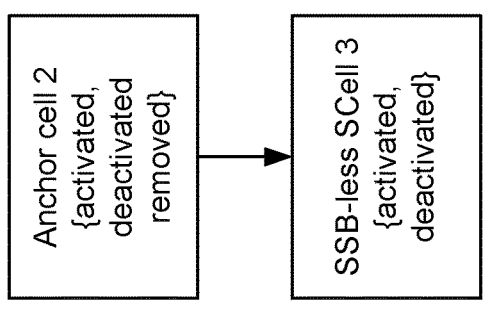
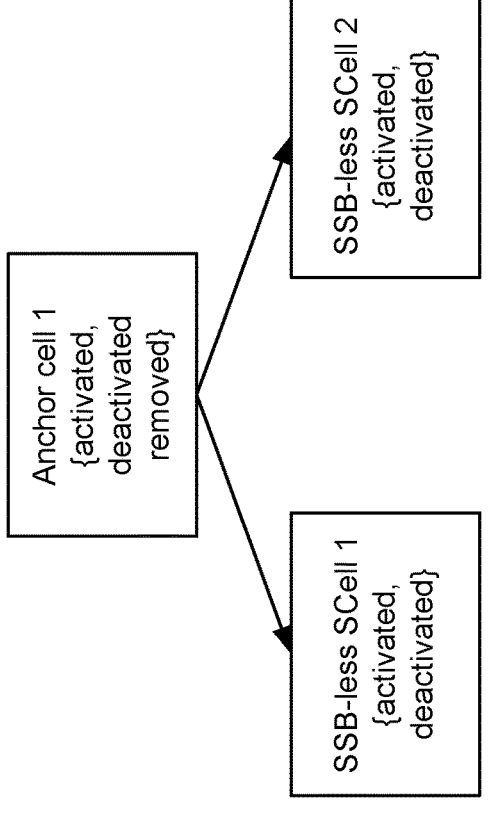
FIGURE 6B

650

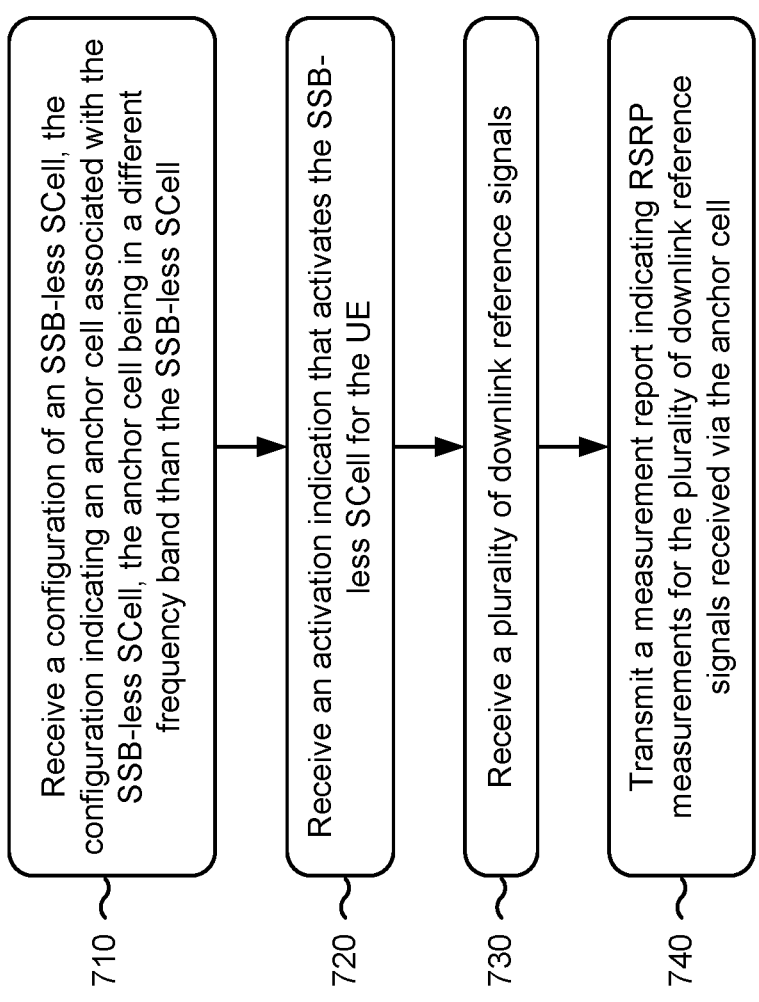

710 Receive a configuration of an SSB-less SCell, the configuration indicating an anchor cell associated with the SSB-less SCell, the anchor cell being in a different frequency band than the SSB-less SCell 720 Receive an activation indication that activates the SSB-less SCell for the UE 730 Receive a plurality of downlink reference signals 740 Transmit a measurement report indicating RSRP measurements for the plurality of downlink reference signals received via the anchor cell

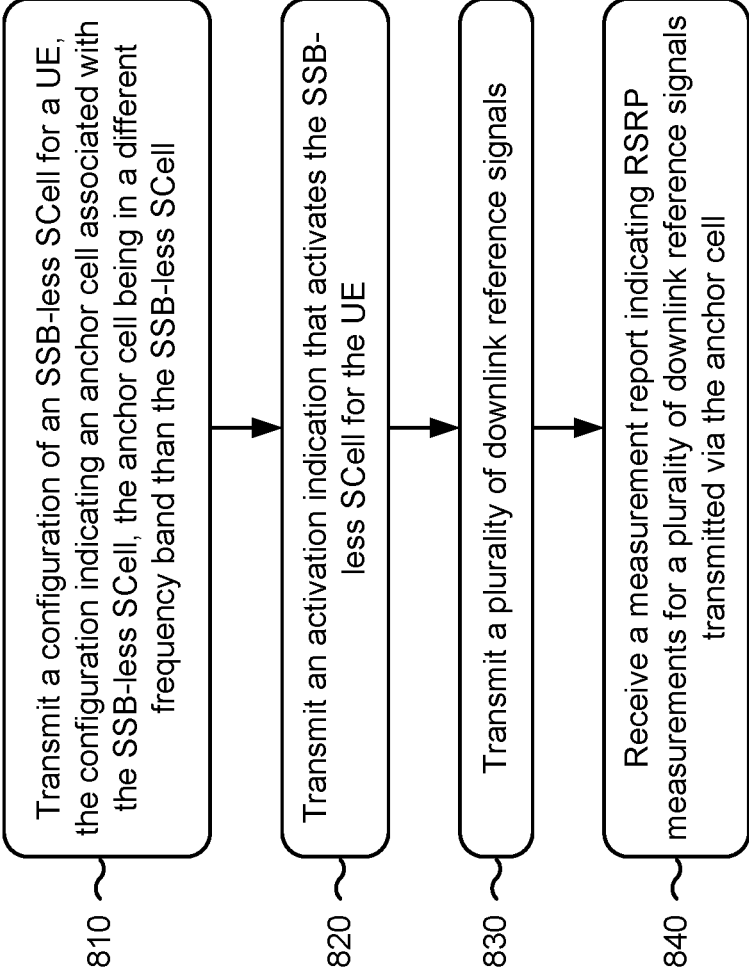

810 — Transmit a configuration of an SSB-less SCell for a UE, the configuration indicating an anchor cell associated with the SSB-less SCell, the anchor cell being in a different frequency band than the SSB-less SCell 820 — Transmit an activation indication that activates the SSB-less SCell for the UE 830 — Transmit a plurality of downlink reference signals 840 — Receive a measurement report indicating RSRP measurements for a plurality of downlink reference signals transmitted via the anchor cell

ANCHOR CELL MANAGEMENT PROCEDURE FOR SYNCHRONIZATION SIGNAL BLOCK (SSB)-LESS CARRIER

FIELD OF THE DISCLOSURE

Aspects of the present disclosure generally relate to wireless communication and specifically, to techniques and apparatuses for anchor cell management for a synchronization signal block (SSB)-less carrier.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

Carrier aggregation is a technology that enables two or more component carriers (CCs, sometimes referred to as carriers) to be combined (for example, into a single channel) for a single user equipment (UE) to enhance data capacity. Carrier aggregation may be configured in an intra-band mode, in which carriers are combined in the same frequency band, or an inter-band mode, in which carriers are combined in different frequency bands. In carrier aggregation, a UE may be configured with a primary carrier or primary cell (PCell) and one or more secondary carriers or secondary cells (SCells).

In some examples, such as in wireless communication networks deployed in a millimeter wave band, some SCells in intra-band carrier aggregation may be deployed without SSB transmission. Deploying SCells without SSB transmission may provide network energy savings in a wireless network. For an SCell deployed without SSB transmission in intra-band carrier aggregation, a UE and a network node may rely on layer 1 (L1) or layer 3 (L3) reference signal received power (RSRP) measurement and reporting on a PCell or another SCell in the same frequency band as the SCell without SSB transmission for beam management or L3 mobility decisions. For serving cells in the same frequency band, similar path loss and beam shape can be expected. However, SCells cannot currently be deployed without SSB transmission unless there is another serving cell with SSB transmission in the same frequency band.

SUMMARY

Some aspects described herein relate to a user equipment (UE) for wireless communication. The UE may include at least one memory and at least one processor communicatively coupled with the at least one memory. The at least one processor may be operable to cause the user equipment to receive, from a network node, a configuration of a synchronization signal block (SSB)-less secondary cell (SCell), the configuration indicating an anchor cell associated with the SSB-less SCell, the anchor cell being in a different frequency band than the SSB-less SCell. The at least one processor may be operable to cause the user equipment to receive, from the network node, an activation indication that activates the SSB-less SCell for the UE. The at least one processor may be operable to cause the user equipment to receive, via the anchor cell, a plurality of downlink reference signals. The at least one processor may be operable to cause the user equipment to transmit, to the network node, a measurement report indicating reference signal received power (RSRP) measurements for the plurality of downlink reference signals received via the anchor cell.

Some aspects described herein relate to a network node for wireless communication. The network node may include at least one memory and at least one processor communicatively coupled with the at least one memory. The at least one processor may be operable to cause the network node to transmit a configuration of a SSB-less SCell for a UE, the configuration indicating an anchor cell associated with the SSB-less SCell, the anchor cell being in a different frequency band than the SSB-less SCell. The at least one processor may be operable to cause the network node to transmit an activation indication that activates the SSB-less SCell for the UE. The at least one processor may be operable to cause the network node to transmit, via the anchor cell, a plurality of downlink reference signals. The at least one processor may be operable to cause the network node to receive a measurement report indicating RSRP measurements for the plurality of downlink reference signals transmitted via the anchor cell.

Some aspects described herein relate to a method of wireless communication performed by a UE. The method may include receiving, from a network node, a configuration of a SSB-less SCell, the configuration indicating an anchor cell associated with the SSB-less SCell, the anchor cell being in a different frequency band than the SSB-less SCell. The method may include receiving, from the network node, an activation indication that activates the SSB-less SCell for the UE. The method may include receiving, via the anchor cell, a plurality of downlink reference signals. The method may include transmitting, to the network node, a measurement report indicating RSRP measurements for the plurality of downlink reference signals received via the anchor cell.

Some aspects described herein relate to a method of wireless communication performed by a network node. The method may include transmitting a configuration of a SSB-less SCell for a UE, the configuration indicating an anchor cell associated with the SSB-less SCell, the anchor cell being in a different frequency band than the SSB-less SCell. The method may include transmitting an activation indication that activates the SSB-less SCell for the UE. The method may include transmitting, via the anchor cell, a plurality of downlink reference signals. The method may include receiving a measurement report indicating RSRP measurements for the plurality of downlink reference signals transmitted via the anchor cell.

Some aspects described herein relate to a non-transitory computer-readable medium that stores a set of instructions for wireless communication by a UE. The set of instructions, when executed by one or more processors of the UE, may cause the UE to receive, from a network node, a configuration of a SSB-less SCell, the configuration indicating an anchor cell associated with the SSB-less SCell, the anchor cell being in a different frequency band than the SSB-less SCell. The set of instructions, when executed by one or more processors of the UE, may cause the UE to receive, from the network node, an activation indication that activates the SSB-less SCell for the UE. The set of instructions, when executed by one or more processors of the UE, may cause the UE to receive, via the anchor cell, a plurality of downlink reference signals. The set of instructions, when executed by one or more processors of the UE, may cause the UE to transmit, to the network node, a measurement report indicating RSRP measurements for the plurality of downlink reference signals received via the anchor cell.

Some aspects described herein relate to a non-transitory computer-readable medium that stores a set of instructions for wireless communication by a network node. The set of instructions, when executed by one or more processors of the network node, may cause the network node to transmit a configuration of a SSB-less SCell for a UE, the configuration indicating an anchor cell associated with the SSB-less SCell, the anchor cell being in a different frequency band than the SSB-less SCell. The set of instructions, when executed by one or more processors of the network node, may cause the network node to transmit an activation indication that activates the SSB-less SCell for the UE. The set of instructions, when executed by one or more processors of the network node, may cause the network node to transmit, via the anchor cell, a plurality of downlink reference signals. The set of instructions, when executed by one or more processors of the network node, may cause the network node to receive a measurement report indicating RSRP measurements for the plurality of downlink reference signals transmitted via the anchor cell.

Some aspects described herein relate to an apparatus for wireless communication. The apparatus may include means for receiving, from a network node, a configuration of a SSB-less SCell, the configuration indicating an anchor cell associated with the SSB-less SCell, the anchor cell being in a different frequency band than the SSB-less SCell. The apparatus may include means for receiving, from the network node, an activation indication that activates the SSB-less SCell for the UE. The apparatus may include means for receiving, via the anchor cell, a plurality of downlink reference signals. The apparatus may include means for transmitting, to the network node, a measurement report indicating RSRP measurements for the plurality of downlink reference signals received via the anchor cell.

Some aspects described herein relate to an apparatus for wireless communication. The apparatus may include means for transmitting a configuration of a SSB-less SCell for a UE, the configuration indicating an anchor cell associated with the SSB-less SCell, the anchor cell being in a different frequency band than the SSB-less SCell. The apparatus may include means for transmitting an activation indication that activates the SSB-less SCell for the UE. The apparatus may include means for transmitting, via the anchor cell, a plurality of downlink reference signals. The apparatus may include means for receiving a measurement report indicating RSRP measurements for the plurality of downlink reference signals transmitted via the anchor cell.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIGS. 6A-6C are diagrams illustrating an example associated with anchor cell management for an SSB-less carrier, in accordance with the present disclosure.

FIG. 7 is a flowchart illustrating an example process performed, for example, by a UE that supports anchor cell management for an SSB-less carrier in accordance with the present disclosure.

FIG. 8 is a flowchart illustrating an example process performed, for example, by a network node that supports anchor cell management for an SSB-less carrier in accordance with the present disclosure.

DETAILED DESCRIPTION

Figure 1:
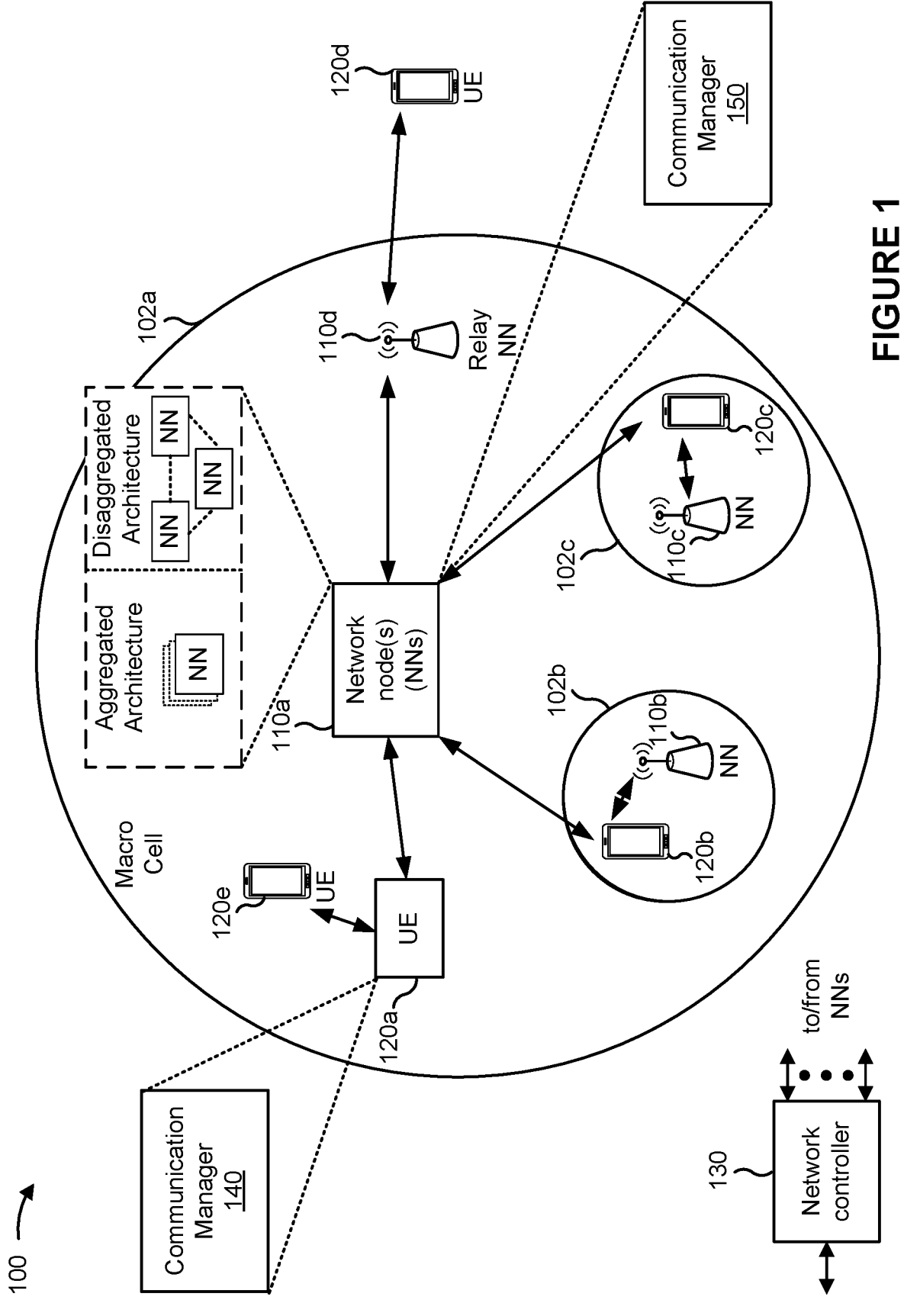
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to inter-band carrier aggregation using a synchronization signal block (SSB)-less secondary cell (SCell). Some aspects more specifically relate to anchor cell management for an SSB-less SCell associated with inter-band carrier aggregation. In some aspects, an anchor cell in a different frequency band than an SSB-less SCell may be used for downlink beam management of the SSB-less SCell. For example, a UE may report, to a network node, reference signal received power (RSRP) measurements for a plurality of downlink reference signals transmitted via the anchor cell, and the network node may determine a downlink beam for the SSB-less SCell based at least in part on the RSRP measurements using a beam mapping function. In some examples in which the SSB-less SCell is added or configured for the UE, the network node may configure the anchor cell associated with the SSB-less SCell. For example, the network node may transmit, to the UE, a configuration of the SSB-less SCell, and the configuration may indicate the anchor cell associated with the SSB-less SCell. In some examples, the anchor cell may be a primary cell (PCell), a primary secondary cell (PSCell), an activated SCell or a deactivated SCell in the same cell group as the SSB-less SCell. In some examples, an anchor cell may be associated with multiple SCells configured for the UE. In some examples, the configuration of an SSB-less SCell may indicate multiple candidate anchor cells associated with the SSB-less SCell. For example, the UE may receive, from the network node, layer 1 (L1) or layer 2 (L2) signaling indicating a selected anchor node from the multiple candidate anchor cells associated with the SSB-less SCell. In another example, the UE may select the anchor node from the multiple candidate anchor cells associated with the SCell based at least in part on priority indexes associated with the multiple candidate anchor cells.

In some aspects, in an activation procedure for activating an SSB-less SCell, the network node may determine whether the SSB-less SCell is known or unknown for the UE. For example, the SSB-less SCell may be known for the UE in instances in which RSRP measurements for a plurality of downlink reference signals transmitted via the anchor cell have been reported by the UE within a time window. Conversely, the SSB-less SCell may be unknown for the UE in instances in which the RSRP measurements for the plurality of downlink reference signals transmitted via the anchor cell have not been reported by the UE within the time window. In some examples, for a known SSB-less SCell, the network node may determine the downlink beam for the SSB-less SCell based at least in part on the RSRP measurements for the downlink reference signals transmitted via the anchor cell, and transmit, to the UE, an activation indication that activates the SSB-less SCell for the UE. In some examples, for an unknown SSB-less SCell, the network node may trigger measurement and reporting, by the UE, of the RSRP measurements for the downlink reference signals transmitted via the anchor cell, determine the beam for the SSB-less SCell based at least in part on the RSRP measurements, and transmit, to the UE, the activation indication that activates the SSB-less SCell for the UE. In some examples, the activation indication may indicate an aperiodic tracking reference signal (TRS) to be transmitted by the network node, and the UE may initialize automatic gain control (AGC), a frequency tracking loop (FTL), and a time tracking loop (TTL) on the SSB-less SCell based at least in part on the aperiodic TRS. In some examples, the UE may perform periodic RSRP measurements on the anchor cell and transmit periodic measurements reports indicating the periodic RSRP measurements, in connection with the SSB-less SCell being in an activated state.

In some examples, an anchor cell associated with an SSB-less SCell may be deactivated. In such instances, the network node may transmit, to the UE, an indication of another anchor cell associated with the SSB-less SCell. In some other examples, the network node may instead transmit, to the UE, an indication to continue periodic RSRP measurements on the deactivated anchor cell. In some other examples, the network node may instead transmit, to the UE, an indication that SSB transmission is triggered on the SSB-less SCell. In some examples, the SSB-less SCell may also be deactivated responsive to, based on or otherwise associated with the anchor cell being deactivated. In some other examples, the anchor cell associated with an SSB-less SCell may be deconfigured, such as when the anchor cell is an SCell in a cell group and the UE receives reconfiguration information indicating that the anchor cell is no longer configured in the cell group for the UE. In such instances, the network node may transmit, to the UE, an indication of another anchor cell associated with the SSB-less SCell. In some other examples, the network node may instead transmit, to the UE, an indication that SSB transmission is triggered on the SSB-less SCell. In some examples, the SSB-less SCell may also be deconfigured responsive to, based on or otherwise associated with the anchor cell being deconfigured.

Particular aspects of the subject matter described in this disclosure can be implemented to realize one or more of the following potential advantages. In some examples, the described techniques can be used to enable SSB-less SCells to be deployed and used for inter-band carrier aggregation. In some examples, deploying SSB-less SCells for inter-band carrier aggregation may result in increased network energy savings while also enabling greater throughput. In some examples, the signaling and procedures described herein enable efficient identification of an anchor cell, beam management for the SSB-less SCell, and activation of the SSB-less SCell. In some examples, the determination of whether the SSB-less SCell is known or unknown based on or otherwise associated with the RSRP measurements performed on the anchor cell may enable the network node to ensure that recent RSRP measurements on the anchor cell are used for downlink beam management on the SSB-less SCell, and thus maintain or increase reliability for downlink communications on the SSB-less SCell. In some examples, the techniques described herein for anchor cell management in instances in which the anchor cell is deactivated or deconfigured may reduce confusion between the UE and the network node when an anchor cell associated with an SSB-less SCell is deactivated or deconfigured, and thus, reduce latency and increase reliability of downlink communications using SSB-less SCells.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110a, a network node 110b, a network node 110c, and a network node 110d), a user equipment (UE) 120 or multiple UEs 120 (shown as a UE 120a, a UE 120b, a UE 120c, a UE 120d, and a UE 120c), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110)

may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a transmission reception point (TRP), a DU, an RU, a CU, a mobility element of a network, a core network node, a network element, a network equipment, and/or a RAN node. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts). In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), and/or a Non-Real Time (Non-RT) RIC. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or the network controller 130 may include a CU or a core network device.

In some examples, a cell may not necessarily be stationary, and the geographic area of the cell may move in accordance with the location of a network node 110 that is mobile (for example, a mobile network node). In some examples, the network nodes 110 may be interconnected to one another or to one or more other network nodes 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. A network node 110 that relays communications may be referred to as a relay station, a relay network node, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IOT) devices, or may be implemented as NB-IOT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120*a* and UE 120*e*) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, the term "sub-6 GHz." if used herein, may broadly represent frequencies that may be less than 6 GHz, may be within FR1, or may include mid-band frequencies. Further, unless specifically stated otherwise, the term "millimeter wave." if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive, from a network node, a configuration of an SSB-less SCell, the configuration indicating an anchor cell associated with the SSB-less SCell, the anchor cell being in a different frequency band than the SSB-less SCell; receive, from a network node, an activation indication that activates the SSB-less SCell for the UE; receive, via the anchor cell, a plurality of downlink reference signals; and transmit, to the network node, a measurement report indicating RSRP measurements for the plurality of downlink reference signals received via the anchor cell. Additionally, or alternatively, the communication manager 140 may perform one or more other operations described herein.

In some aspects, the network node 110 may include a communication manager 150. As described in more detail elsewhere herein, the communication manager 150 may transmit a configuration of an SSB-less SCell for a UE, the configuration indicating an anchor cell associated with the SSB-less SCell, the anchor cell being in a different frequency band than the SSB-less SCell; transmit an activation indication that activates the SSB-less SCell for the UE; transmit, via the anchor cell, a plurality of downlink reference signals; and receive a measurement report indicating RSRP measurements for the plurality of downlink reference signals transmitted via the anchor cell. Additionally, or alternatively, the communication manager 150 may perform one or more other operations described herein.

Figure 2:
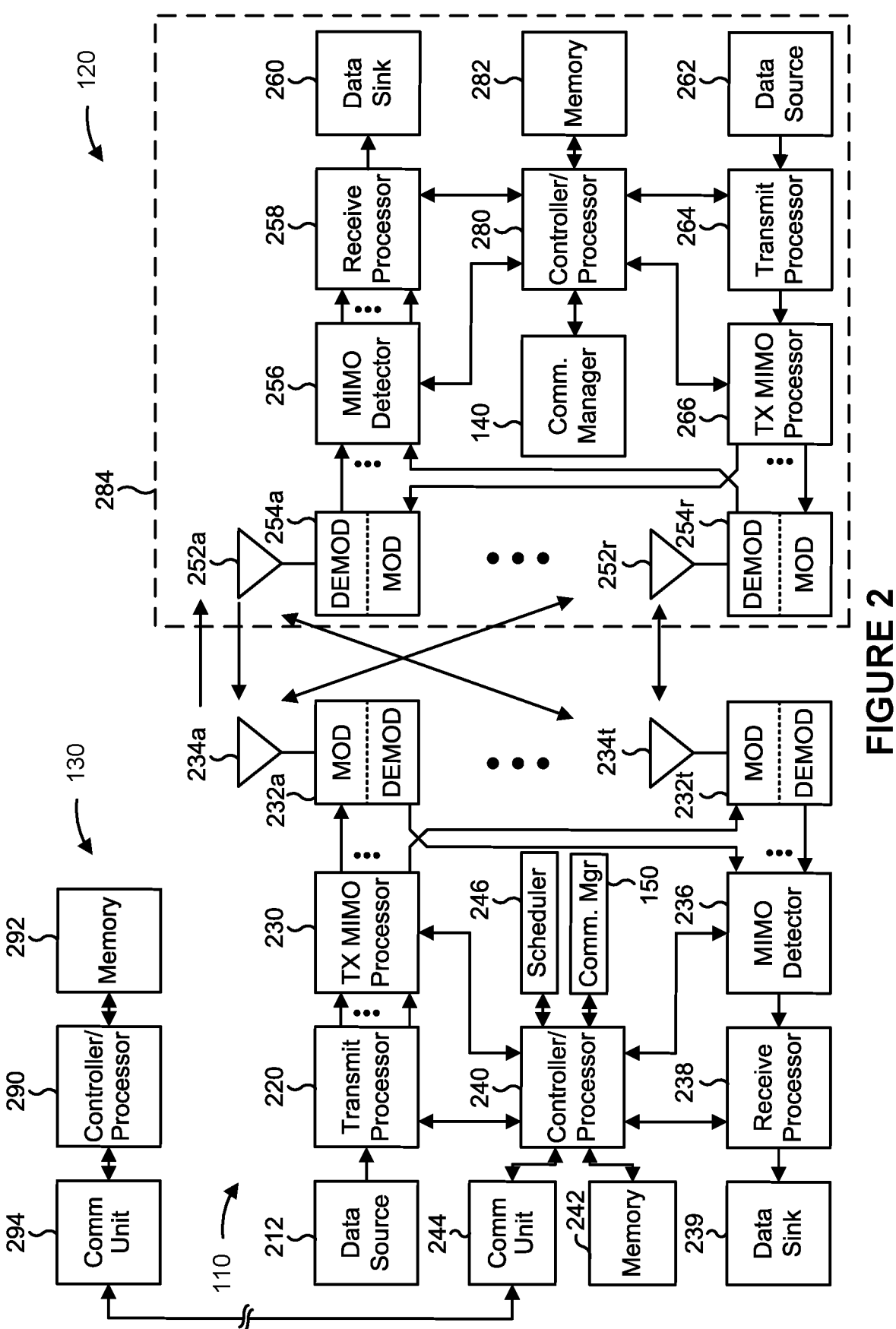
FIG. 2 is a diagram illustrating an example network node in communication with a user equipment (UE) in a wireless network in accordance with the present disclosure.

FIG. 2 is a diagram illustrating an example network node in communication with a UE in a wireless network in accordance with the present disclosure. The network node may correspond to the network node 110 of FIG. 1. Similarly, the UE may correspond to the UE 120 of FIG. 1. The network node 110 may be equipped with a set of antennas 234a through 234t, such as T antennas (T≥1). The UE 120 may be equipped with a set of antennas 252a through 252r, such as R antennas (R≥1). The network node 110 of depicted in FIG. 2 includes one or more radio frequency components, such as antennas 234 and a modem 232. In some examples, a network node 110 may include an interface, a communication component, or another component that facilitates communication with the UE 120 or another network node.

Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers and/or one or more processors. A channel processor may determine a RSRP parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP. RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network node 110, the controller/processor 280 of the UE 120, or any other component(s) of FIG. 2 may perform one or more techniques associated with anchor cell management for an SSB-less carrier, as described in more detail elsewhere herein. For example, the controller/processor 240 of the network node 110, the controller/processor 280 of the UE 120, or any other component(s) of FIG. 2 may perform or direct operations of, for example, process 800 of FIG. 8, process 900 of FIG. 9, or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 800 of FIG. 8, process 900 of FIG. 9, or other processes as described herein. In some examples, executing instructions may include running the instructions, converting the instructions, compiling the instructions, or interpreting the instructions, among other examples.

In some aspects, a UE (for example, the UE 120) includes means for receiving, from a network node, a configuration of an SSB-less SCell, the configuration indicating an anchor cell associated with the SSB-less SCell, the anchor cell being in a different frequency band than the SSB-less SCell; means for receiving, from the network node, an activation indication that activates the SSB-less SCell for the UE; means for receiving, via the anchor cell, a plurality of downlink reference signals; and/or means for transmitting, to the network node, a measurement report indicating RSRP measurements for the plurality of downlink reference signals received via the anchor cell. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (for example, the network node 110) includes means for transmitting a configuration of an SSB-less SCell for a UE, the configuration indicating an anchor cell associated with the SSB-less SCell, the anchor cell being in a different frequency band than the SSB-less SCell; means for transmitting an activation indication that activates the SSB-less SCell for the UE; means for transmitting, via the anchor cell, a plurality of downlink reference signals; and/or means for receiving a measurement report indicating RSRP measurements for the plurality of downlink reference signals transmitted via the anchor cell. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, and/or one or more RUs).

An aggregated base station (for example, an aggregated network node) may be configured to utilize a radio protocol stack that is physically or logically integrated within a single RAN node (for example, within a single device or unit). A disaggregated base station (for example, a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
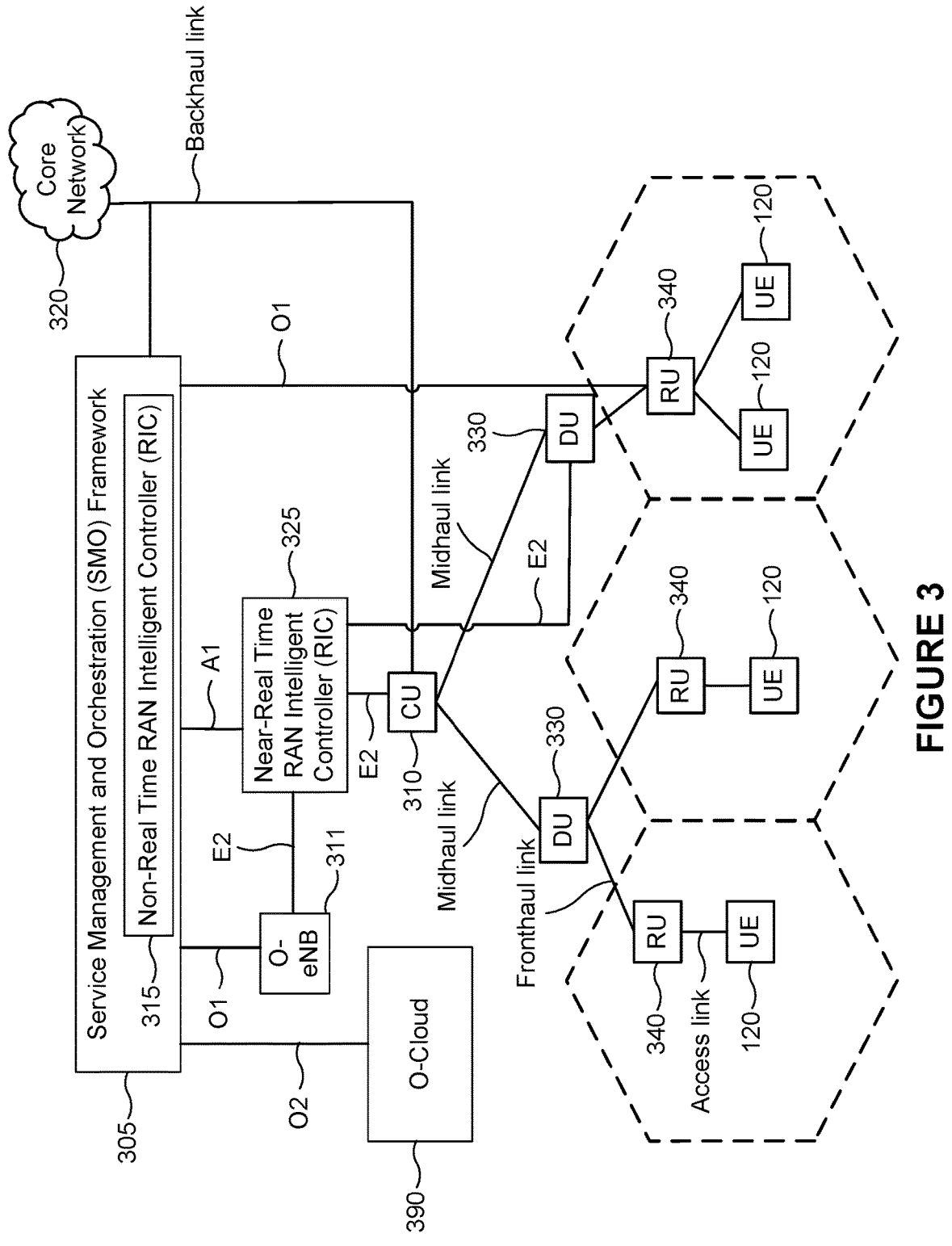
FIG. 3 is a diagram illustrating an example disaggregated base station architecture in accordance with the present disclosure.

FIG. 3 is a diagram illustrating an example disaggregated base station architecture 300 in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include RRC functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), and/or control plane functionality (for example, Central Unit-Control Plane (CU-CP) functionality). In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

Figure 4:
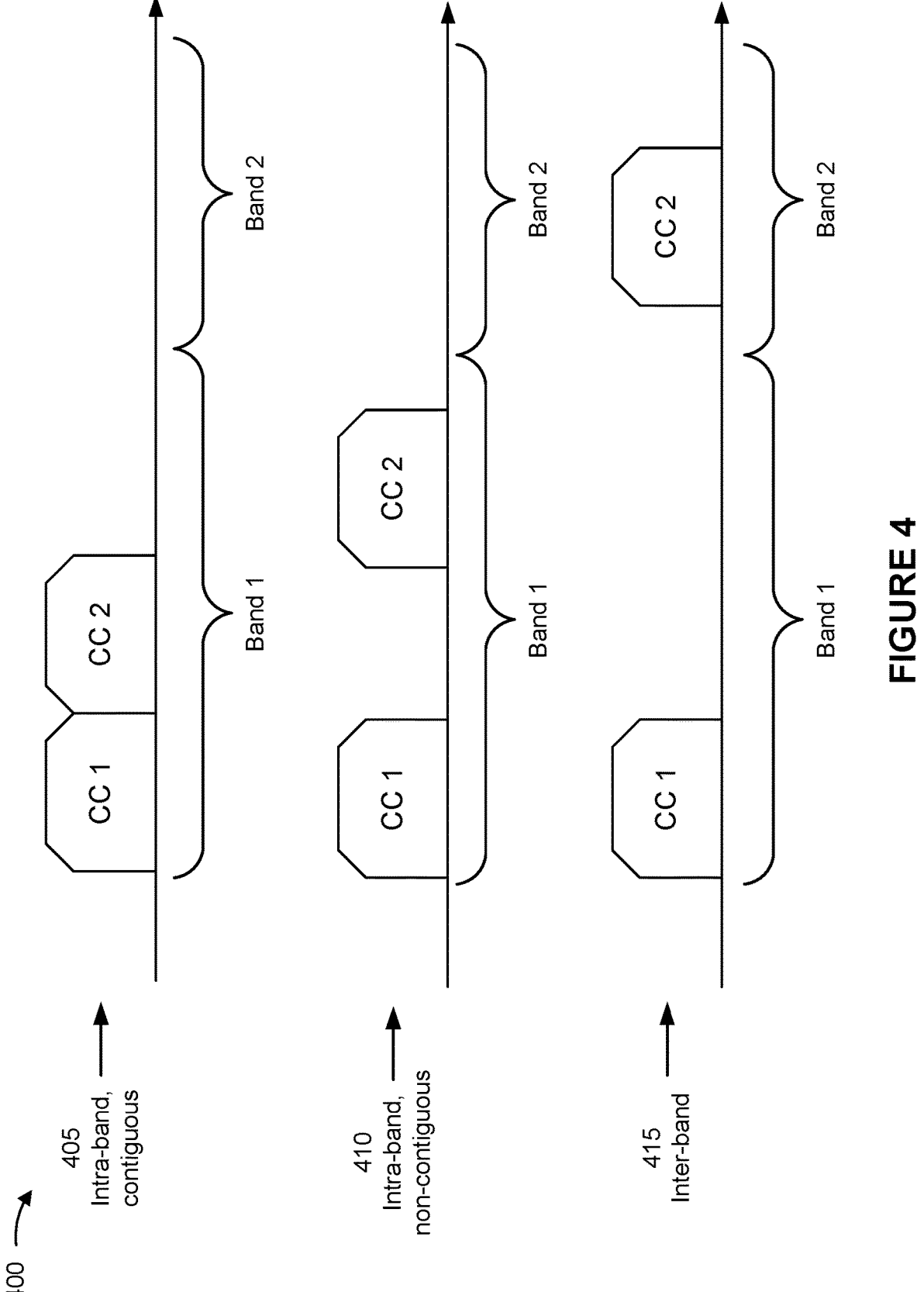
FIG. 4 is a diagram illustrating examples of carrier aggregation, in accordance with the present disclosure.

FIG. 4 is a diagram illustrating examples 400 of carrier aggregation, in accordance with the present disclosure.

Carrier aggregation is a technology that enables two or more component carriers (CCs, sometimes referred to as carriers) to be combined (for example, into a single channel) for a single UE 120 to enhance data capacity. As shown, carriers can be combined in the same or different frequency bands. Additionally, or alternatively, contiguous or non-contiguous carriers can be combined. A network node 110 may configure carrier aggregation for a UE 120, such as in a radio resource control (RRC) message, downlink control information (DCI), and/or another signaling message.

As shown by reference number 405, in some aspects, carrier aggregation may be configured in an intra-band contiguous mode where the aggregated carriers are contiguous to one another and are in the same band. As shown by reference number 410, in some aspects, carrier aggregation may be configured in an intra-band non-contiguous mode where the aggregated carriers are non-contiguous to one another and are in the same band. As shown by reference number 415, in some aspects, carrier aggregation may be configured in an inter-band mode where the aggregated carriers are in different bands.

In carrier aggregation, a UE 120 may be configured with a primary carrier or PCell and one or more secondary carriers or SCells. In some aspects, the primary carrier may carry control information (for example, DCI and/or scheduling information) for scheduling data communications on one or more secondary carriers, which may be referred to as cross-carrier scheduling. In some aspects, a carrier (for example, a primary carrier or a secondary carrier) may carry control information for scheduling data communications on the carrier, which may be referred to as self-carrier scheduling or carrier self-scheduling. In some examples, a UE 120 may be configured with carrier aggregation and multiple connectivity. In such examples, the UE 120 may be configured with multiple cell groups, including a master cell group (MCG) and one or more secondary cell groups (SCG). Each cell group may include a PCell and one or more SCells. The PCell of an SCG may be referred as a PSCell. A special cell (SPCell) may refer to a PCell or an PSCell.

In some examples, such as in some FR2 deployments, some SCells in intra-band carrier aggregation may be deployed without SSB transmission. An SCell that is deployed without SSB transmission is referred to as an "SSB-less SCell." Deploying SCells without SSB transmission may provide network energy savings in a wireless network. For an SCell deployed without SSB transmission in intra-band carrier aggregation, a UE and a network node may rely on L1 or layer 3 (L3) RSRP measurement and reporting on a PCell (or PSCell) or another SCell in the same frequency band as the SSB-less SCell for beam management or an L3 mobility decision. For serving cells in the same frequency band, similar path loss and beam shape can be expected. However, SSB-less SCells cannot currently be deployed unless there is another serving cell with SSB transmission in the same frequency band.

Various aspects relate generally to SSB-less SCells in inter-band carrier aggregation. Some aspects more specifically relate to anchor cell management for an SSB-less SCell in inter-band carrier aggregation. In some aspects, an anchor cell in a different frequency band from an SSB-less SCell may be used for downlink beam management of the SSB-less SCell. For example, a UE may report, to a network node, RSRP measurements for a plurality of downlink reference signals transmitted via the anchor cell, and the network node may determine a downlink beam for the SSB-less SCell based at least in part on the RSRP measurements for the downlink reference signals transmitted via the anchor cell using a beam mapping function. In some aspects, when the SSB-less SCell is added or configured for the UE, the network node may configure the anchor cell associated with the SSB-less SCell. For example, the network node may transmit, to the UE, a configuration of the SSB-less SCell, and the configuration may indicate the anchor cell associated with the SSB-less SCell. In some aspects, the anchor cell may be a PCell, a PSCell, an activated SCell or a deactivated SCell in the same cell group as the SSB-less SCell. In some aspects, an anchor cell may be associated with multiple SCells configured for the UE. In some aspects, the configuration of an SSB-less SCell may indicate multiple candidate anchor cells associated with the SSB-less SCell. For example, the UE may receive, from the network node, L1 or L2 signaling indicating a selected anchor node from the multiple candidate anchor cells associated with the SSB-less SCell. In another example, the UE may select the anchor node from the multiple candidate anchor cells associated with the SCell based at least in part on priority indexes associated with the multiple candidate anchor cells. In some aspects, in an activation procedure for activating an SSB-less SCell, the network node may determine whether the SSB-less SCell is known or unknown for the UE. For example, the SSB-less SCell may be known for the UE if RSRP measurements for a plurality of downlink reference signals transmitted via the anchor cell have been reported by the UE within a time window, or the SSB-less SCell may be unknown for the UE if the RSRP measurements for the plurality of downlink reference signals transmitted via the anchor cell have not been reported by the UE within the time window. In some aspects, for a known SSB-less SCell, the network node may determine the downlink beam for the SSB-less SCell based at least in part on the RSRP measurements for the downlink reference signals transmitted via the anchor cell, and transmit, to the UE, an activation indication that activates the SSB-less SCell for the UE. In some aspects, for an unknown SSB-less SCell, the network node may trigger measurement and reporting, by the UE, of the RSRP measurements for the downlink reference signals transmitted via the anchor cell, determine the beam for the SSB-less SCell based at least in part on the RSRP measurements for the downlink reference signals transmitted on the anchor cell, and transmit, to the UE, the activation indication that activates the SSB-less SCell for the UE. In some aspects, the activation indication may indicate an aperiodic TRS to be transmitted by the network node, and the UE may initialize AGC, an FTL, and a TTL on the SSB-less SCell based at least in part on the aperiodic TRS. In some aspects, the UE may perform periodic RSRP measurements on the anchor cell and transmit periodic measurements reports indicating the periodic RSRP measurements, in connection with the SSB-less SCell being in an activated state. In some aspects, the anchor cell associated with an SSB-less SCell may be deactivated. For example, when the anchor cell is deactivated, the network node may transmit, to the UE, an indication of another anchor cell associated with the SSB-less SCell. In another example, when the anchor cell is deactivated, the network node may transmit, to the UE, an indication to continue periodic RSRP measurements on the deactivated anchor cell. In another example, when the anchor cell is deactivated, the network node may transmit, to the UE, an indication that SSB transmission is triggered on the SSB-less SCell. In another example, when the anchor cell is deactivated, the SSB-less SCell may also be deactivated. In some aspects, the anchor cell associated with an SSB-less SCell may be deconfigured. For example, when the anchor cell is deconfigured, the network node may transmit, to the UE, an indication of another anchor cell associated with the SSB-less SCell. In another example, when the anchor cell is deconfigured, the network node may transmit, to the UE, an indication that SSB transmission is triggered on the SSB-less SCell. In another example, when the anchor cell is deconfigured, the SSB-less SCell may also be deconfigured.

Particular aspects of the subject matter described in this disclosure can be implemented to realize one or more of the following potential advantages. In some examples, the described techniques can be used to enable SSB-less SCells to be deployed in inter-band carrier aggregation. In some examples, deploying SSB-less SCells in inter-band carrier aggregation may result in increased network energy savings. In some examples, the operations described herein for the configuration and activation of a SSB-less SCell can be used to specify signaling and procedures that enable efficient identification of an anchor cell, beam management for the SSB-less SCell, and activation of the SSB-less SCell. In some examples, the determination of whether the SSB-less SCell is known or unknown based on or otherwise associated with the RSRP measurements performed on the anchor cell may enable the network node to ensure that that recent RSRP measurements on the anchor cell are used for downlink beam management on the SSB-less SCell, and thus increase reliability for downlink communications on the SSB-less SCell. In some examples, the techniques described herein for anchor cell management when the anchor cell is deactivated or deconfigured may reduce confusion between the UE and the network node when an anchor cell associated with an SSB-less SCell is deactivated or deconfigured, and thus, reduce latency and increase reliability of downlink communications using SSB-less SCells.

Figure 5:
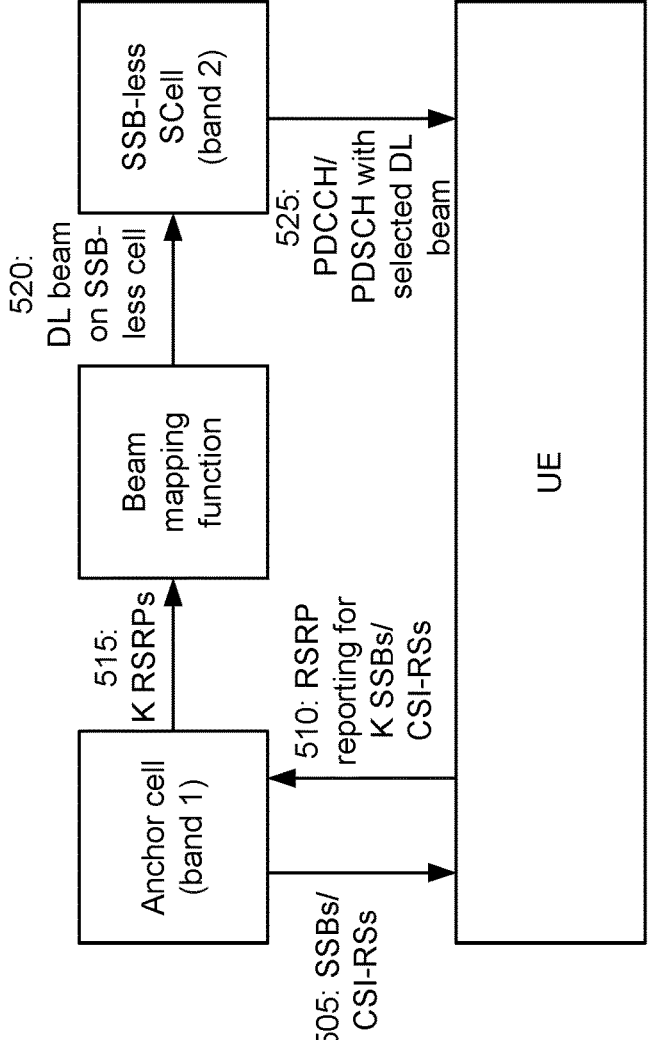
FIG. 5 is a diagram illustrating an example of downlink beam determination for a synchronization signal block (SSB)-less secondary cell (SCell), in accordance with the present disclosure.

FIG. 5 is a diagram illustrating an example 500 of downlink beam determination for an SSB-less SCell, in accordance with the present disclosure.

As shown in FIG. 5, in some aspects, a SSB-less SCell may be deployed in inter-band carrier aggregation. For example, an anchor cell associated with the SSB-less SCell may be in a first frequency band (band 1) and the SSB-less SCell may be in a second frequency band (band 2). In some aspects, a network node (for example, a gNB) may use L1-RSRP reporting for multiple SSBs and/or channel state information (CSI) reference signals (CSI-RSs) transmitted via the anchor cell to determine a downlink beam (for example, a best downlink beam) on the SSB-less SCell. The network node may configure a UE to measure L1-RSRP measurements for K SSBs and/or CSI-RSs on the anchor cell and report the K RSRP measurements. For example, for each SSB or CSI-RS index n, the network node may configure a group of K SSBs and/or CSI-RSs on the anchor cell to be measurement and reported together. The UE may measure and report the RSRP values for the K SSBs and/or CSI-RSs associated with an SSB or CSI-RS index of the SSB or CSI-RS with the strongest RSRP measurement on the anchor cell. In some aspects, K may be a quantity, configured by the network node, that is greater than or equal to one. For example, K=1 may be configured in a case in which the spatial beam shape is nearly identical between the anchor cell and the SSB-less SCell. In some aspects, the UE may report an indication that an RSRP value is not detected for an SSB or CSI-RS that cannot be measured or detected by the UE. As shown in FIG. 5, in a first operation 505, the UE may receive SSBs and/or CSI-RSs via the anchor cell. In a second operation 510, the UE may perform the RSRP measurements for the K SSBs and/or CSI-RSs and report the RSRP measurements for the K SSBs and/or CSI-RSs received via the anchor cell to the network node. For example, the UE may report the RSRP measurements for the K SSBs and/or CSI-RSs via the anchor cell (as shown in FIG. 5) or a PCell.

The network node may determine the downlink beam for the SSB-less SCell using a beam mapping function between the K RSRPs measured on the anchor cell and a downlink beam (or beams) (for example, a best one or more downlink beams) on the SSB-less SCell. In some aspects, the beam mapping function may include a look-up table. In some other aspects, the beam mapping function may include a non-linear function, such as a neural network or another machine learning model. As shown in FIG. 5, in a third operation 515, the network node may input the K RSRPs measured on the anchor cell to the beam mapping function. In a fourth operation 520, the beam mapping function may output the downlink beam to be used for the SSB-less SCell. For example, the network node may use the beam mapping function to determine the downlink beam for the SSB-less SCell based at least in part on the K RSRP measurements performed on the anchor cell. In a fifth operation, the network node may transmit a downlink communication to the UE via the SSB-less SCell using the downlink beam determined/selected by the beam mapping function. For example, the network node may transmit, and the UE may receive, a physical downlink control channel (PDCCH) communication and/or a physical downlink shared channel (PDSCH) communication via the SSB-less SCell using the downlink beam determined/selected by the beam mapping function.

Figure 6A:
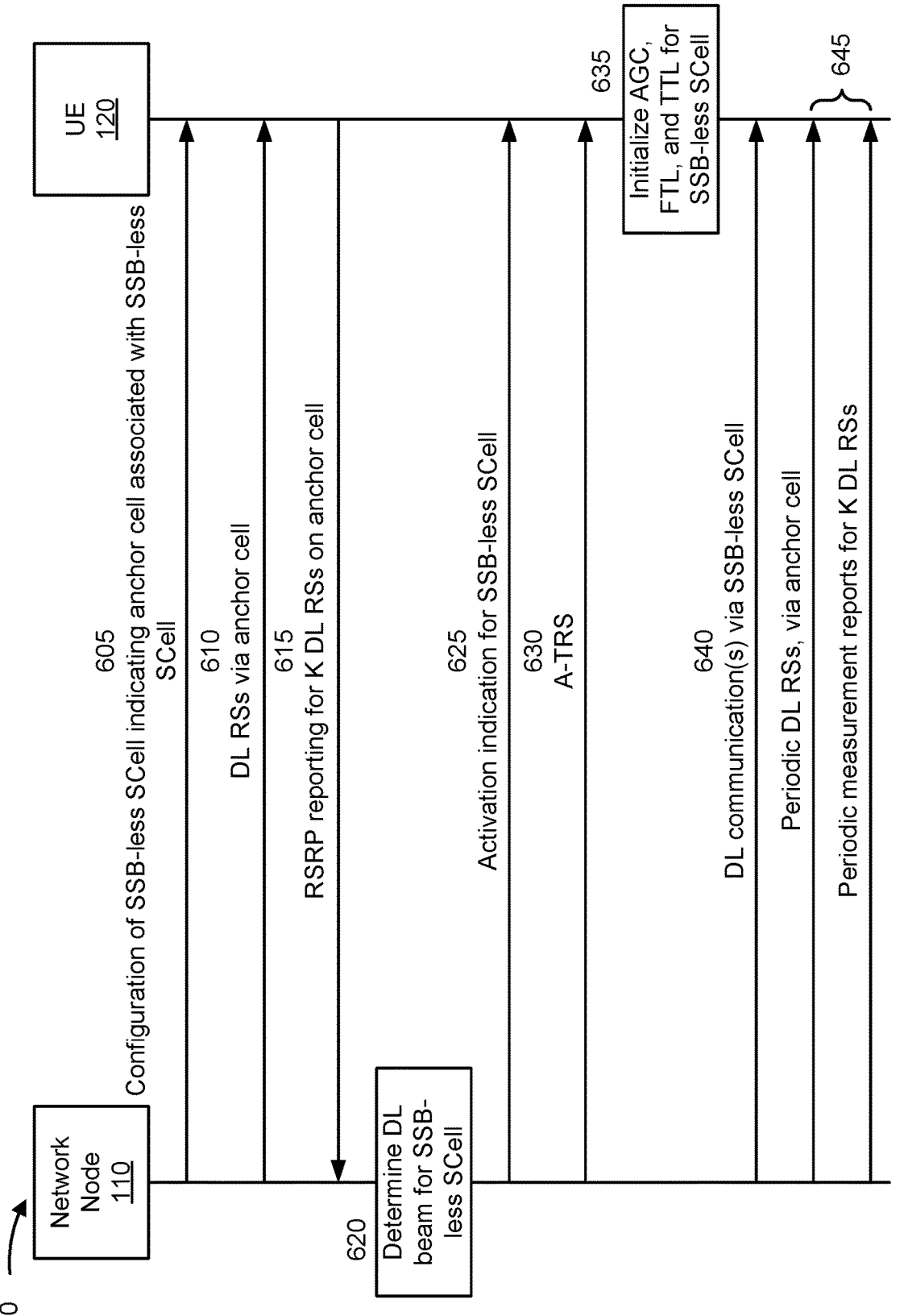
Figure 6C:
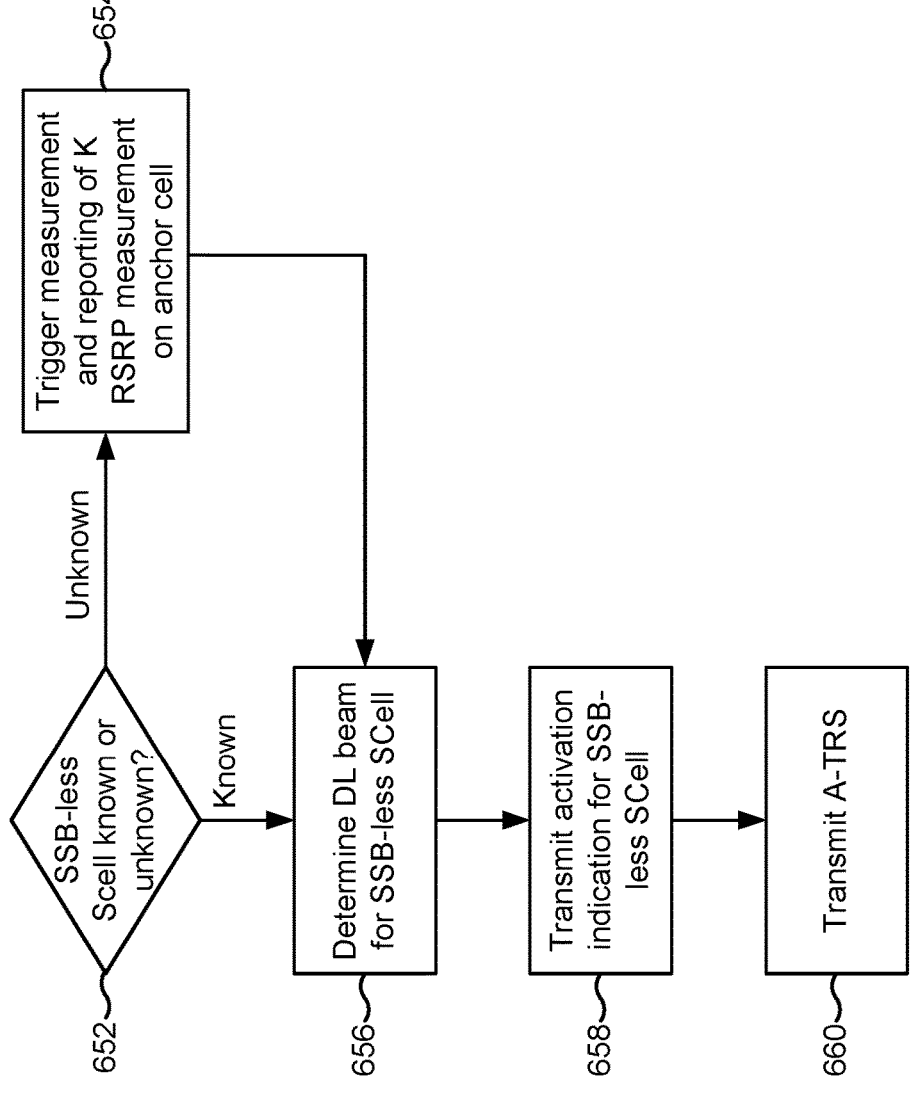

FIGS. 6A-6C are diagrams illustrating an example 600 associated with anchor cell management for an SSB-less carrier, in accordance with the present disclosure. As shown in FIG. 6A, example 600 includes communication between a network node 110 and a UE 120. In some aspects, the network node 110 and the UE 120 may be included in a wireless network, such as wireless network 100. The network node 110 and the UE 120 may communicate via a wireless access link, which may include an uplink and a downlink.

As shown in FIG. 6A, in a first operation 605, the network node 110 may transmit, and the UE 120 may receive, a configuration of an SSB-less SCell. The configuration of the SSB-less SCell may indicate an anchor cell associated with the SSB-less SCell. In some aspects, the configuration of the SSB-less SCell may be included in an RRC message. In some aspects, the network node 110 may transmit the configuration of the SSB-less SCell to the UE 120 via a PCell or an PSCell. The network node 110 may transmit the configuration to the UE 120 to configure or add the SSB-less SCell as an SCell for the UE 120. Configuration of the SSB-less SCell may also be referred to as SSB-less SCell addition.

The anchor cell associated with the SSB-less SCell may be a cell/carrier to be used for downlink beam management of the SSB-less SCell when the SSB-less SCell is activated. The anchor cell may be another cell in the same cell group as the SSB-less SCell. In some aspects, the anchor cell may be a PCell, a PSCell, an activated SCell, or a deactivated SCell in the same cell group as the SSB-less SCell being configured. In some aspects, the SSB-less SCell and the anchor cell associated with the SSB-less SCell may be in different frequency bands. That is, the SSB-less SCell and the anchor cell may be cells configured for inter-band carrier aggregation. The anchor cell may be a cell for which there is a beam mapping function between the SSB-less SCell and the anchor cell available at the network node 110 or another network device. In some aspects, the SSB-less SCell may not be able to be configured when the anchor cell indicated in the configuration is not available.

In some aspects, multiple SSB-less SCells and/or multiple anchor cells may be configured for the UE 120. For example, the network node 110 may transmit, and the UE 120 may receive respective configurations for multiple SSB-less SCells, each indicating a respective anchor cell associated with that SSB-less SCell. In some aspects, an anchor cell may be associated with multiple SSB-less SCells. For example, as shown in FIG. 6B, the UE 120 may be configured with a first SSB-less SCell (SSB-less SCell 1), a second SSB-less SCell (SSB-less SCell 2), and a third SSB-less SCell (SSB-less SCell 3). In the example of FIG. 6B, a first anchor cell (Anchor cell 1) may be associated with SSB-less SCell 1 and SSB-less SCell 2, and a second anchor cell (Anchor cell 2) may be associated with SSB-less SCell 3. Each SSB-less SCell may be activated or deactivated for the UE 120, as discussed elsewhere herein. Each anchor cell may be activated, deactivated, or removed (for example, deconfigured), which may affect the beam management on the associated SSB-less SCell(s), as discussed elsewhere herein.

In some aspects, multiple anchor cells may be configured for an SSB-less SCell when the SSB-less SCell is added/configured for the UE 120. In such examples, the configuration of the SSB-less SCell may indicate a plurality of candidate anchor cells associated with the SSB-less SCell. In some aspects, the network node 110 may select an anchor cell (for example, an activated anchor cell), from the plurality of candidate anchor cells, to be used for beam management of the SSB-less SCell, and the network node 110 may transmit, to the UE 120, an indication of the selected anchor cell for the SSB-less SCell. For example, the selected anchor cell, from the plurality of candidate anchor cells configured for the SSB-less SCell, may be explicitly indicated in a MAC control element (MAC-CE) or DCI. In such examples, the network node 110 may transmit the MAC-CE or DCI including the indication of the selected anchor cell to the UE 120 during activation of the SSB-less SCell (for example, in an activation MAC-CE) or after the SSB-less SCell is activated (for example, to switch the anchor cell for the activated SSB-less SCell). In this way, L1 or L2 signaling may be used to switch the anchor cell used for beam management for an SSB-less SCell.

In some other aspects, the anchor cell to be used for beam management for the SSB-less SCell may be selected implicitly based at least in part on (or otherwise associated with) priority indexes associated with the candidate anchor cells configured for the SSB-less SCell. In such examples, the configuration of the SSB-less SCell may indicate a respective distinct priority index assigned to (or otherwise associated with) each candidate anchor cell of the plurality of candidate anchor cells configured for the SSB-less SCell. The UE 120 may select which anchor cell, from the plurality of candidate anchor cells, is to be used for beam management for the SSB-less SCell based at least in part on the priority indexes associated with the configured candidate anchor cells. For example, in a case in which there are one or more activated candidate anchor cells, the UE 120 may select the activated anchor cell with the highest priority index to be the anchor cell for the SSB-less SCell. In a case, in which all of the candidate anchor cells are deactivated, the UE 120 may select a deactivated candidate anchor cell with the highest priority index to be the anchor cell for the SSB-less SCell. In such examples, the network node 110 may similarly determine which anchor cell, from the plurality of candidate anchor cells configured for the SSB-less SCell, is to be used for beam management of the SSB-less SCell.

Returning to FIG. 6A, in a second operation 610, the network node 110 may transmit a plurality of downlink reference signals via the anchor cell. For example, the plurality of downlink reference signals may include SSBs and/or CSI-RSs. In some aspects, the plurality of downlink reference signals may include downlink reference signals (for example SSBs and/or CSI-RSs) transmitted via the anchor cell using different downlink beams. The UE 120 may receive the downlink reference signals via the anchor cell. The UE 120 may perform RSRP measurements (for example, L1 RSRP measurements) for the plurality of downlink reference signals (for example, SSBs and/or CSI-RSs) received via the anchor cell.

In a third operation 615, the UE 120 may transmit, to the network node 110, a measurement report indicating RSRP measurements for the plurality of downlink reference signals received via the anchor cell. The network node 110 may receive the measurement report transmitted by the UE 120. In some aspects, the UE 120 may transmit the measurement report on the PCell. In some other aspects, the UE 120 may transmit the measurement report on the anchor cell.

In some aspects, the UE 120 may measure and report RSRPs for K downlink reference signals (for example, SSBs and/or CSI-RSs) on the anchor cell. In some aspects, for each SSB or CSI-RS index for the anchor cell, the network node 110 may configure a group of K SSBs and/or CSI-RSs to be measured and reported together for downlink beam management of the SSB-less SCell. The UE 120 may measure and report the RSRPs for the K SSBs and/or CSI-RSs associated with the SSB or CSI-RS index of the SSB or CSI-RS with the strongest RSRP measurement for the anchor cell. The measurement and reporting of the RSRP measurements for the K downlink reference signals (for example, SSBs and/or CSI-RSs) may be referred to as "K-RSRP measurement and reporting." In some aspects, K may be a quantity configured by the network node 110 and indicated in the configuration for the SSB-less SCell. In some aspects, K may be greater than 1. In other aspects, K may be greater than or equal to 1. In such examples, K=1 may be configured when the network node 110 knows (for example, based on or otherwise associated with the beam mapping function) that the spatial beam shape is nearly identical between the anchor cell and the SSB-less SCell.

In some aspects, the K-RSRP measurement reporting described in connection with operations 610 and 615 may be performed as part of an activation procedure for activating the SSB-less SCell, as discussed in greater detail below in connection with FIG. 6C. In some other aspects, the K-RSRP measurement and reporting described in connection with operations 610 and 615 may be performed prior to an activation procedure for the SSB-less SCell, such as in connection with the same anchor cell being associated with one or more other SSB-less SCells that have been activated.

As further shown in FIG. 6A, in a fourth operation 620, the network node 110 may determine a downlink beam for the SSB-less SCell based at least in part on the RSRP measurements for the K downlink reference signals on the anchor cell. In some aspects, the network node 110 may determine the downlink beam for the SSB-less SCell using a beam mapping function between the K RSRP measurements on the anchor cell and one or more downlink beams (for example, one or more best downlink beams) on the SSB-less SCell, as described above in connection with FIG. 5.

In a fifth operation 625, the network node 110 may transmit, and the UE 120 may receive, an activation indication for the SSB-less SCell. The activation indication may activate the SSB-less SCell for the UE 120. In some aspects, the activation indication may be a MAC-CE for activating the SSB-less SCell for the UE 120. In some aspects, the network node 110 may transmit the activation indication to the UE 120 via a PCell. In some aspects, in connection with activating the SSB-less SCell for the UE 120, the network node 110 may trigger an aperiodic TRS (A-TRS) for fast loop initialization, by the UE 120, on the SSB-less SCell. In such examples, the activation indication (for example, the MAC-CE for activating the SSB-less SCell) may indicate scheduling information for the A-TRS.

In a sixth operation 630, the network node 110 may transmit the A-TRS via the SSB-less SCell. The UE 120 may receive the A-TRS via the SSB-less SCell. In a seventh operation 635, the UE 120 may initialize AGC, an FTL, and a TTL on the SSB-less SCell based at least in part on or responsive to the A-TRS received via the SSB-less SCell.

In some aspects, operations 620, 625, 630, and 635 may be performed as part of an activation procedure for activating an SSB-less SCell. FIG. 6C shows an example process 650 for activating an SSB-less SCell for the UE 120. Process 650 may be performed, for example, by the network node 110.

As shown in FIG. 6C, process 650 may begin with operation 652. In operation 652, the network node 110 may determine whether the SSB-less SCell is known or unknown for the UE 120. For example, at a time at which the network node 110 determines that the SSB-less SCell is to be activated for the UE 120, the network node 110 may determine whether the SSB-less SCell to be activated is known or unknown. However, because an SSB-less SCell does not transmit SSBs and the UE 120 does not report SSB measurements performed on the SSB-less SCell or an SSB of the SSB-less SCell with a strongest measurement, the definitions for known or unknown cells for cells with SSB transmission do not apply to an SSB-less SCell. In some aspects, an SSB-less SCell may be considered (or determined) to be a known cell if the K RSRP measurements for the anchor cell were reported by the UE 120 within a time window preceding the current time (for example, the time at which the network node 110 determines to activate the SSB-less SCell). In some aspects, an SSB-less SCell may be considered or determined to be an unknown cell if the K RSRP measurements for the anchor cell were not reported by the UE 120 within the time window preceding the current time (for example, the time at which the network node 110 determines to activate the SSB-less SCell). In such examples, the time window may be configured as M seconds (for example, M=3).

If, in operation 652, the network node 110 determines that the SSB-less SCell is known for the UE 120 (for example, in connection with a determination that the K RSRP measurements for the anchor cell have been received within the preceding M seconds), process 650 proceeds to operation 656. If, in operation 652, the network node 110 determines that the SSB-less SCell is unknown for the UE 120 (for example, in connection with a determination that the K RSRP measurements for the anchor cell have not been received within the preceding M seconds), process 650 proceeds to operation 654.

In operation 654, the network node 110 may trigger measurement and reporting of the K RSRP measurements on the anchor cell by the UE 120. For example, in connection with the determination that the SSB-less SCell is unknown in operation 652, the network node 110 may transmit, to the UE 120, an indication to trigger the UE 120 to receive a plurality of downlink reference signals (for example, SSBs and/or CSI-RSs) via the anchor cell and to perform and report RSRP measurements for K downlink reference signals received via the anchor cell. The network node 110 may then transmit the plurality of downlink reference signals via the anchor cell (for example, as described in connection with operation 610 of FIG. 6A). The UE 120 may perform the RSRP measurements for the plurality of downlink reference signals, and the UE 120 may transmit, to the network node 110, the measurement report indicating the K RSRP measurements (for example, as described in connection with operation 615 of FIG. 6A). Process 650 may the proceed to operation 656.

In operation 656, the network node 110 may determine a downlink beam for the SSB-less SCell based at least in part on the K RSRP measurements performed on the anchor cell. For example, in connection with the determination that the SSB-less SCell is known in operation 652, the network node 110 may determine the downlink beam for the SSB-less SCell based at least in part on the K RSRP measurements on the anchor cell received within the time window (for example, within the preceding M seconds). In connection with the determination that the SSB-less SCell is an unknown cell in operation 652, the network node 110 may determine the downlink beam for the SSB-less SCell based at least in part on the K RSRP measurements on the anchor cell received in connection with triggering the measurement and reporting of the K RSRP measurements on the anchor cell in operation 654. The network node 110 may determine the downlink beam using a beam mapping function between the K RSRP measurements on the anchor cell and one or more beams on the SSB-less SCell, as described in connection with FIG. 5 and operation 620 of FIG. 6A.

In operation 658, the network node 110 may transmit the activation indication for the SSB-less SCell. For example, after the downlink beam for the SSB-less SCell is determined (in operation 656), the network node 110 may transmit the activation indication (for example, a MAC-CE activation indication) to activate the SSB-less SCell for the UE 120 (for example, as described in connection with operation 625 of FIG. 6A).

In operation 660, the network node 110 may transmit an A-TRS via the SSB-less SCell for initialization of AGC, an FTL, and a TTL on the SSB-less SCell (for example, as described in connection with operation 630 of FIG. 6A). The activation indication (for example, the MAC-CE activation indication) may indicate scheduling information for the A-TRS. The UE 120 may initialize AGC, the FTL, and the TTL on the SSB-less SCell based at least in part on the A-TRS transmitted via the SSB-less SCell (for example, as described in connection with operation 635 of FIG. 6A).

Returning to FIG. 6A, in an eighth operation 640, the network node 110 may transmit one or more downlink communications to the UE 120 via the SSB-less SCell on the downlink beam determined for the SSB-less SCell based at least in part on the K RSRP measurements on the anchor cell. The UE 120 may receive the one or more downlink communications via the SSB-less SCell using the downlink beam determined for the SSB-less SCell based at least in part on the K RSRP measurements on the anchor cell.

As further shown in FIG. 6A, in a ninth operation 645, the UE 120 may perform periodic K-RSRP measurement and reporting on the anchor cell associated with the SSB-less SCell, in connection with the SSB-less SCell being activated. For example, the network node 110 may periodically transmit the plurality of downlink reference signals (for example, SSBs and/or CSI-RSs) via the anchor cell in connection with the SSB-less SCell being in an activated state. The UE 120, in connection with the SSB-less SCell being in the activated state, may perform periodic RSRP measurements for the plurality of downlink reference signals transmitted via the anchor cell and transmit periodic measurement reports respectively indicating respective periodic RSRP measurements for the plurality of downlink reference signals transmitted via the anchor cell (for example the K RSRP measurements). The network node 110 may receive the periodic measurement reports indicating the K RSRP measurements. In some aspects, the network node 110 may update the downlink beam for the SSB-less SCell, using the beam mapping function, based at least in part on the K RSRP measurements indicated in a periodic measurement report.

In some aspects, in a case in which an anchor cell is associated with a plurality of SSB-less SCells, the UE 120 may perform periodic K-RSRP measurement and reporting on the anchor cell when at least one SSB-less SCell, of the plurality SSB-less SCells, is activated. In such examples, the network node 110 may periodically transmit the downlink reference signals via the anchor cell and receive the periodic measurement reports for the K RSRP measurements on the anchor cell when at least one SSB-less SCell, of the plurality SSB-less SCells, is in an activated state. In some aspects, the network node 110 may configure the periodicity of the K-RSRP measurement and reporting, such as in the configuration of the SSB-less SCell or in the activation indication for the SSB-less SCell. In some aspects, when all SSB-less SCells associated with an anchor cell are deactivated, the network node 110 may indicate to the UE 120 to stop the periodic K-RSRP measurement and reporting on the anchor cell.

In some aspects, the anchor cell associated with an SSB-less SCell may be deactivated for the UE 120. For example, the anchor associated with an activated SSB-less SCell may be deactivated. In such examples, the network node 110 may transmit, and the UE 120 may receive, a deactivation indication indicating deactivation of the anchor cell. In some aspects, when the anchor cell is deactivated, the network node 110 may determine whether there is an alternative activated anchor cell that can be used for the SSB-less SCell (or multiple SSB-less SCells) associated with the deactivated anchor cell. For example, when the network node 110 determines that there is another activated anchor cell that can be used for beam management for one or more SSB-less SCells associated with the deactivated anchor cell, the network node 110 may switch the anchor cell for the one or more SSB-less SCells to the other activated anchor cell. In such examples, the network node 110 may transmit, and the UE 120 may receive, in connection with the deactivation of the anchor cell associated with an SSB-less SCell, and indication of another anchor cell (for example, another activated anchor cell) associated with the SSB-less SCell. For example, the indication of the other anchor cell may be included in RRC message, a MAC-CE, or DCI.

In some other aspects, when the anchor cell associated with an SSB-less SCell is deactivated, the network node 110 may request that the UE 120 continue to perform periodic K-RSRP measurement and reporting on the deactivated anchor cell. For example, the network node 110 may transmit, and the UE 120 may receive, in connection with the deactivation of the anchor cell, and indication (for example, via an RRC message, a MAC-CE, or DCI) to continue performing periodic RSRP measurements for the plurality of downlink reference signals on the anchor cell and reporting the RSRP measurements while the anchor cell is in the deactivated state. In some aspects, the network node 110 may request that the UE 120 continues the periodic K-RSRP measurement and reporting on the deactivated anchor cell when the anchor cell is deactivated and when the network node 110 cannot find an alternative activated anchor cell for the SSB-less SCell.

In some other aspects, when the anchor cell associated with an SSB-less SCell is deactivated, the network node 110 may trigger SSB transmission on that SCell. That is, the network node 110 may trigger a switch in an operation mode of the SSB-less SCell from an SCell without SSB transmission to an SCell with SSB transmission. In such examples, in connection with the anchor cell being deactivated, the network node 110 may transmit, and the UE 120 may receive, an indication (for example, via an RRC message, a MAC-CE, or DCI) that SSB transmission is triggered for an SSB-less SCell, resulting in the SSB-less SCell becoming an SCell with SSB transmission. In some aspects, the SCell that switches from being the SSB-less SCell to the SCell with SSB transmission may then be configured as an anchor cell for one or more other SSBs that were associated with the deactivated anchor cell. For example, the network node 110 may transmit, and the UE 120 may receive, and indication configuring the SCell that was previously an SSB-less SCell to be an anchor cell for one or more other SSB-less SCells. In some aspects, the network node 110 may trigger SSB transmission on an SSB-less SCell when the anchor cell associated with the SSB-less SCell is deactivated and when the network node 110 cannot find an alternative activated anchor cell for the SSB-less SCell.

In some other aspects, when the anchor cell associated with an SSB-less SCell is deactivated, the SSB-less SCell may also be deactivated. For example, upon deactivation of the anchor cell, all SSB-less SCells associated with that anchor cell may be deactivated. In some aspects, the deactivation of an SSB-less SCell associated with the anchor cell may be indicated via a separate explicit deactivation command. For example, the network node 110 may transmit, and the UE 120 may receive a deactivation indication indicating deactivation of the anchor cell, and the network node 110 may transmit, and the UE 120 may receive, in connection with the deactivation of the anchor cell, another deactivation indication indicating deactivation of the SSB-less SCell. In some other aspects, the deactivation of an SSB-less SCell associated with the anchor cell may be triggered implicitly by the deactivation of the anchor cell. For example, the deactivation indication that indicates deactivation of the anchor cell may also implicitly deactivate all SSB-less SCells associated with the anchor cell. In some aspects, the SSB-less SCell associated with an anchor cell may be deactivated when the anchor cell is deactivated and when the network node 110 cannot find an alternative activated anchor cell for the SSB-less SCell.

In some aspects, the anchor cell associated with an SSB-less SCell may be deconfigured (or removed) for the UE 120. For example, the anchor associated with an activated SSB-less SCell may be deconfigured. In such examples, the network node 110 may transmit, and the UE 120 may receive, reconfiguration information indicating that the anchor cell is deconfigured for the UE 120. For example, the reconfiguration information may not include a configuration for the anchor cell that was previously configured for the UE 120. In some aspects, when the anchor cell is deconfigured, the network node 110 may determine whether there is an alternative activated or deactivated anchor cell that can be used for the SSB-less SCell (or multiple SSB-less SCells) associated with the deconfigured anchor cell. For example, when the network node 110 determines that there is another activated or deactivated anchor cell that can be used for beam management for one or more SSB-less SCells associated with the deconfigured anchor cell, the network node 110 may switch the anchor cell for the one or more SSB-less SCells to the other anchor cell. In such examples, the network node 110 may transmit, and the UE 120 may receive, in connection with the anchor cell associated with an SSB-less SCell being deconfigured, an indication of another anchor cell associated with the SSB-less SCell. For example, the indication of the other anchor cell may be included in RRC message, a MAC-CE, or DCI.

In some other aspects, when the anchor cell associated with an SSB-less SCell is deconfigured, the network node 110 may trigger SSB transmission on that SCell. That is, the network node 110 may trigger a switch in an operation mode of the SSB-less SCell from an SCell without SSB transmission to an SCell with SSB transmission. In such examples, in connection with the anchor cell being deconfigured, the network node 110 may transmit, and the UE 120 may receive, an indication (for example, via an RRC message, a MAC-CE, or DCI) that SSB transmission is triggered for an SSB-less SCell, resulting in the SSB-less SCell becoming an SCell with SSB transmission. In some aspects, the SCell that switches from being the SSB-less SCell to the SCell with SSB transmission may then be configured as an anchor cell for one or more other SSBs that were associated with the deconfigured anchor cell. For example, the network node 110 may transmit, and the UE 120 may receive, and indication configuring the SCell that was previously an SSB-less SCell to be an anchor cell for one or more other SSB-less SCells. In some aspects, the network node 110 may trigger SSB transmission on an SSB-less SCell when the anchor cell associated with the SSB-less SCell is deconfigured and when the network node 110 cannot find an alternative activated or deactivated anchor cell for the SSB-less SCell.

In some other aspects, when the anchor cell associated with an SSB-less SCell is deconfigured, the SSB-less SCell may also be deconfigured (or removed) for the UE 120. For example, the network node 110 may transmit, and the UE 120 may receive reconfiguration information indicating that the anchor cell is deconfigured for the UE 120. The network node 110 may also transmit, and the UE 120 may also receive, in connection with the anchor cell being deconfigured for the UE 120, reconfiguration information indicating deconfiguration of the SSB-less SCell for the UE 120. In some aspects, the SSB-less SCell associated with an anchor cell may be deconfigured when the anchor cell is deconfigured and when the network node 110 cannot find an alternative activated or deactivated anchor cell for the SSB-less SCell.

FIG. 7 is a flowchart illustrating an example process 700 performed, for example, by a UE that supports anchor cell management for an SSB-less carrier in accordance with the present disclosure. Example process 700 is an example where the UE (for example, UE 120) performs operations associated with anchor cell management for an SSB-less carrier.

As shown in FIG. 7, in some aspects, process 700 may include receiving, from a network node, a configuration of an SSB-less SCell, the configuration indicating an anchor cell associated with the SSB-less SCell, the anchor cell being in a different frequency band than the SSB-less SCell (block 710). For example, the UE (such as by using communication manager 140 or reception component 902, depicted in FIG. 9) may receive, from a network node, a configuration of an SSB-less SCell, the configuration indicating an anchor cell associated with the SSB-less SCell, the anchor cell being in a different frequency band than the SSB-less SCell, as described above.

As further shown in FIG. 7, in some aspects, process 700 may include receiving, from the network node, an activation indication that activates the SSB-less SCell for the UE (block 720). For example, the UE (such as by using communication manager 140 or reception component 902, depicted in FIG. 9) may receive, from the network node, an activation indication that activates the SSB-less SCell for the UE, as described above.

As further shown in FIG. 7, in some aspects, process 700 may include receiving, via the anchor cell, a plurality of downlink reference signals (block 730). For example, the UE (such as by using communication manager 140 or reception component 902, depicted in FIG. 9) may receive, via the anchor cell, a plurality of downlink reference signals, as described above.

As further shown in FIG. 7, in some aspects, process 700 may include transmitting, to the network node, a measurement report indicating RSRP measurements for the plurality of downlink reference signals received via the anchor cell (block 740). For example, the UE (such as by using communication manager 140 or transmission component 904, depicted in FIG. 9) may transmit, to the network node, a measurement report indicating RSRP measurements for the plurality of downlink reference signals received via the anchor cell, as described above.

Process 700 may include additional aspects, such as any single aspect or any combination of aspects described below or in connection with one or more other processes described elsewhere herein.

In a first additional aspect, process 700 includes receiving a downlink communication via the SSB-less SCell on a downlink beam based at least in part on the RSRP measurements for the plurality of downlink reference signals received via the anchor cell.

In a second additional aspect, alone or in combination with the first aspect, the anchor cell is a PCell, a PSCell, an activated SCell, or a deactivated SCell in a cell group of the SSB-less SCell.

In a third additional aspect, alone or in combination with one or more of the first and second aspects, the activation indication indicates an aperiodic TRS for initialization of AGC, an FTL, and a TTL on the SSB-less SCell.

In a fourth additional aspect, alone or in combination with one or more of the first through third aspects, the SSB-less SCell is a known cell for the UE based at least in part on the RSRP measurements for the plurality of downlink reference signals received via the anchor cell being reported within a time window preceding a time associated with activation of the SSB-less SCell, or the SSB-less SCell is an unknown cell for the UE based at least in part on the RSRP measurements for the plurality of downlink reference signals on the anchor cell not being reported within a time window preceding a time associated with activation of the SSB-less SCell.

In a fifth additional aspect, alone or in combination with one or more of the first through fourth aspects, process 700 includes receiving, in connection with the SSB-less SCell being an unknown cell, an indication, prior to the activation indication, to trigger the UE to receive the plurality of reference signals via the anchor cell and to perform and report the RSRP measurements for the plurality of downlink reference signals received via the anchor cell.

In a sixth additional aspect, alone or in combination with one or more of the first through fifth aspects, process 700 includes performing periodic RSRP measurements for the plurality of downlink reference signals received via the anchor cell in connection with the SSB-less SCell being in an activated state, transmitting periodic measurement reports respectively indicating respective periodic RSRP measurements for the plurality of downlink reference signals received via the anchor cell in connection with the SSB-less cell being in the activated state.

In a seventh additional aspect, alone or in combination with one or more of the first through sixth aspects, the anchor cell is associated with a plurality of SSB-less SCells including the SSB-less SCell, and process 700 includes performing periodic RSRP measurements for the plurality of downlink reference signals received via the anchor cell in connection with at least one SSB-less cell of the plurality of SSB-less SCells being in an activated state, transmitting periodic measurement reports respectively indicating respective periodic RSRP measurements for the plurality of downlink reference signals received via the anchor cell in connection with at least one SSB-less cell of the plurality of SSB-less SCells being in the activated state.

In an eighth additional aspect, alone or in combination with one or more of the first through seventh aspects, process 700 includes receiving a deactivation indication indicating deactivation of the anchor cell, and receiving, in connection with the deactivation of the anchor cell, an indication of another anchor cell associated with the SSB-less SCell.

In a ninth additional aspect, alone or in combination with one or more of the first through eighth aspects, process 700 includes receiving a deactivation indication indicating deactivation of the anchor cell, and receiving, in connection with the deactivation of the anchor cell, an indication to continue performing RSRP measurements for the plurality of downlink reference signals on the anchor cell while the anchor cell is in a deactivated state.

In a tenth additional aspect, alone or in combination with one or more of the first through ninth aspects, process 700 includes receiving a deactivation indication indicating deactivation of the anchor cell, and receiving, in connection with the deactivation of the anchor cell, an indication that SSB transmission is triggered for the SSB-less SCell, resulting in the SSB-less SCell becoming an SCell with SSB transmission.

In an eleventh additional aspect, alone or in combination with one or more of the first through tenth aspects, process 700 includes receiving an indication configuring the SCell with SSB transmission to be an anchor cell for one or more other SSB-less SCells.

In a twelfth additional aspect, alone or in combination with one or more of the first through eleventh aspects, process 700 includes receiving a deactivation indication indicating deactivation of the anchor cell, wherein the SSB-less SCell is deactivated in connection with the deactivation of the anchor cell.

In a thirteenth additional aspect, alone or in combination with one or more of the first through twelfth aspects, process 700 includes receiving, in connection with the deactivation of the anchor cell, another deactivation indication indicating deactivation of the SSB-less SCell.

In a fourteenth additional aspect, alone or in combination with one or more of the first through thirteenth aspects, process 700 includes receiving reconfiguration information indicating that the anchor cell is deconfigured for the UE, and receiving, in connection with the anchor cell being deconfigured for the UE, an indication of another anchor cell associated with the SSB-less SCell.

In a fifteenth additional aspect, alone or in combination with one or more of the first through fourteenth aspects, process 700 includes receiving reconfiguration information indicating that the anchor cell is deconfigured for the UE, and receiving, in connection with the anchor cell being deconfigured for the UE, an indication that SSB transmission is triggered for the SSB-less SCell, resulting in the SSB-less SCell becoming an SCell with SSB transmission.

In a sixteenth additional aspect, alone or in combination with one or more of the first through fifteenth aspects, process 700 includes receiving an indication configuring the SCell with SSB transmission to be an anchor cell for one or more other SSB-less SCells.

In a seventeenth additional aspect, alone or in combination with one or more of the first through sixteenth aspects, process 700 includes receiving reconfiguration information indicating that the anchor cell is deconfigured for the UE, and receiving, in connection with the anchor cell being deconfigured for the UE, reconfiguration information indicating deconfiguration of the SSB-less SCell for the UE.

In an eighteenth additional aspect, alone or in combination with one or more of the first through seventeenth aspects, the configuration indicates a plurality of candidate anchor cells, including the anchor cell, associated with the SSB-less SCell.

In a nineteenth additional aspect, alone or in combination with one or more of the first through eighteenth aspects, process 700 includes receiving an indication of a selection of the anchor cell from the plurality of candidate anchor cells.

In a twentieth additional aspect, alone or in combination with one or more of the first through nineteenth aspects, process 700 includes selecting the anchor cell from the plurality of candidate anchor cells based at least in part on respective priority indexes associated with the plurality of candidate anchor cells.

In a twenty-first additional aspect, alone or in combination with one or more of the first through twentieth aspects, selecting the anchor cell from the plurality of candidate anchor cells based at least in part on respective priority indexes associated with the plurality of candidate anchor cells includes selecting, in connection with one or more of the plurality of candidate anchor cells being activated, the anchor cell from the plurality of candidate anchor cells based at least in part on the anchor cell being an activated anchor cell with a highest priority index, or selecting, in connection with all of the plurality of candidate anchor cells being deactivated, the anchor cell from the plurality of candidate anchor cells based at least in part on the anchor cell being a deactivated anchor cell with a highest priority index.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

FIG. 8 is a flowchart illustrating an example process 800 performed, for example, by a network node that supports anchor cell management for an SSB-less carrier in accordance with the present disclosure. Example process 800 is an example where the network node (for example, network node 110) performs operations associated with anchor cell management for an SSB-less carrier.

As shown in FIG. 8, in some aspects, process 800 may include transmitting a configuration of an SSB-less SCell for a UE, the configuration indicating an anchor cell associated with the SSB-less SCell, the anchor cell being in a different frequency band than the SSB-less SCell (block 810). For example, the network node (such as by using communication manager 150 or transmission component 1004, depicted in FIG. 10) may transmit a configuration of an SSB-less SCell for a UE, the configuration indicating an anchor cell associated with the SSB-less SCell, the anchor cell being in a different frequency band than the SSB-less SCell, as described above.

As further shown in FIG. 8, in some aspects, process 800 may include transmitting an activation indication that activates the SSB-less SCell for the UE (block 820). For example, the network node (such as by using communication manager 150 or transmission component 1004, depicted in FIG. 10) may transmit an activation indication that activates the SSB-less SCell for the UE, as described above.

As further shown in FIG. 8, in some aspects, process 800 may include transmitting, via the anchor cell, a plurality of downlink reference signals (block 830). For example, the network node (such as by using communication manager 150 or transmission component 1004, depicted in FIG. 10) may transmit, via the anchor cell, a plurality of downlink reference signals, as described above.

As further shown in FIG. 8, in some aspects, process 800 may include receiving a measurement report indicating RSRP measurements for the plurality of downlink reference signals transmitted via the anchor cell (block 840). For example, the network node (such as by using communication manager 150 or reception component 1002, depicted in FIG. 10) may receive a measurement report indicating RSRP measurements for the plurality of downlink reference signals transmitted via the anchor cell, as described above.

Process 800 may include additional aspects, such as any single aspect or any combination of aspects described below or in connection with one or more other processes described elsewhere herein.

In a first additional aspect, process 800 includes transmitting a downlink communication via the SSB-less SCell on a downlink beam determined based at least in part on the RSRP measurements for the plurality of downlink reference signals transmitted via the anchor cell.

In a second additional aspect, alone or in combination with the first aspect, the anchor cell is a PCell, a PSCell, an activated SCell, or a deactivated SCell in a cell group of the SSB-less SCell.

In a third additional aspect, alone or in combination with one or more of the first and second aspects, the activation indication indicates an aperiodic TRS for initialization of AGC, an FTL, and a TTL on the SSB-less SCell.

In a fourth additional aspect, alone or in combination with one or more of the first through third aspects, the SSB-less SCell is a known cell for the UE based at least in part on the RSRP measurements for the plurality of downlink reference signals transmitted via the anchor cell being reported within a time window preceding a time associated with activation of the SSB-less SCell, or the SSB-less SCell is an unknown cell for the UE based at least in part on the RSRP measurements for the plurality of downlink reference signals transmitted via the anchor cell not being reported within a time window preceding a time associated with activation of the SSB-less SCell.

In a fifth additional aspect, alone or in combination with one or more of the first through fourth aspects, process 800 includes transmitting, in connection with a determination that the SSB-less SCell is an unknown cell for the UE, an indication, prior to the activation indication, to trigger the UE to receive the plurality of reference signals transmitted via the anchor cell and to perform and report the RSRP measurements for the plurality of downlink reference signals transmitted via the anchor cell.

In a sixth additional aspect, alone or in combination with one or more of the first through fifth aspects, process 800 includes periodically transmitting the plurality of downlink reference signals via the anchor cell in connection with the SSB-less SCell being in an activated state, receiving periodic measurement reports respectively indicating respective periodic RSRP measurements for the plurality of downlink reference signals periodically transmitted via the anchor cell in connection with the SSB-less cell being in the activated state.

In a seventh additional aspect, alone or in combination with one or more of the first through sixth aspects, the anchor cell is associated with a plurality of SSB-less SCells including the SSB-less SCell, and process 800 includes periodically transmitting the plurality of downlink reference signals via the anchor cell in connection with at least one SSB-less cell of the plurality of SSB-less SCells being in an activated state, receiving periodic measurement reports respectively indicating respective periodic RSRP measurements for the plurality of downlink reference signals periodically transmitted via the anchor cell in connection with at least one SSB-less cell of the plurality of SSB-less SCells being in the activated state.

In an eighth additional aspect, alone or in combination with one or more of the first through seventh aspects, process 800 includes transmitting a deactivation indication indicating deactivation of the anchor cell, and transmitting, in connection with the deactivation of the anchor cell, an indication of another anchor cell associated with the SSB-less SCell.

In a ninth additional aspect, alone or in combination with one or more of the first through eighth aspects, process 800 includes transmitting a deactivation indication indicating deactivation of the anchor cell, and transmitting, in connection with the deactivation of the anchor cell, an indication for the UE to continue performing RSRP measurements for the plurality of downlink reference signals on the anchor cell while the anchor cell is in a deactivated state.

In a tenth additional aspect, alone or in combination with one or more of the first through ninth aspects, process 800 includes transmitting a deactivation indication indicating deactivation of the anchor cell, and transmitting, in connection with the deactivation of the anchor cell, an indication that SSB transmission is triggered for the SSB-less SCell, resulting in the SSB-less SCell becoming an SCell with SSB transmission.

In an eleventh additional aspect, alone or in combination with one or more of the first through tenth aspects, process 800 includes transmitting an indication configuring the SCell with SSB transmission to be an anchor cell for one or more other SSB-less SCells.

In a twelfth additional aspect, alone or in combination with one or more of the first through eleventh aspects, process 800 includes transmitting a deactivation indication indicating deactivation of the anchor cell, wherein the SSB-less SCell is deactivated in connection with the deactivation of the anchor cell.

In a thirteenth additional aspect, alone or in combination with one or more of the first through twelfth aspects, process 800 includes transmitting, in connection with the deactivation of the anchor cell, another deactivation indication indicating deactivation of the SSB-less SCell.

In a fourteenth additional aspect, alone or in combination with one or more of the first through thirteenth aspects, process 800 includes transmitting reconfiguration information indicating that the anchor cell is deconfigured for the UE, and transmitting, in connection with the anchor cell being deconfigured for the UE, an indication of another anchor cell associated with the SSB-less SCell.

In a fifteenth additional aspect, alone or in combination with one or more of the first through fourteenth aspects, process 800 includes transmitting reconfiguration information indicating that the anchor cell is deconfigured for the UE, and transmitting, in connection with the anchor cell being deconfigured for the UE, an indication that SSB transmission is triggered for the SSB-less SCell, resulting in the SSB-less SCell becoming an SCell with SSB transmission.

In a sixteenth additional aspect, alone or in combination with one or more of the first through fifteenth aspects, process 800 includes transmitting an indication configuring the SCell with SSB transmission to be an anchor cell for one or more other SSB-less SCells.

In a seventeenth additional aspect, alone or in combination with one or more of the first through sixteenth aspects, process 800 includes transmitting reconfiguration information indicating that the anchor cell is deconfigured for the UE, and transmitting, in connection with the anchor cell being deconfigured for the UE, reconfiguration information indicating deconfiguration of the SSB-less SCell for the UE.

In an eighteenth additional aspect, alone or in combination with one or more of the first through seventeenth aspects, the configuration indicates a plurality of candidate anchor cells, including the anchor cell, associated with the SSB-less SCell.

In a nineteenth additional aspect, alone or in combination with one or more of the first through eighteenth aspects, process 800 includes transmitting an indication of a selection of the anchor cell from the plurality of candidate anchor cells.

Although FIG. 8 shows example blocks of process 800, in some aspects, process 800 may include additional blocks, fewer blocks, different blocks, or differently arranged blocks than those depicted in FIG. 8. Additionally or alternatively, two or more of the blocks of process 800 may be performed in parallel.

Figure 9:
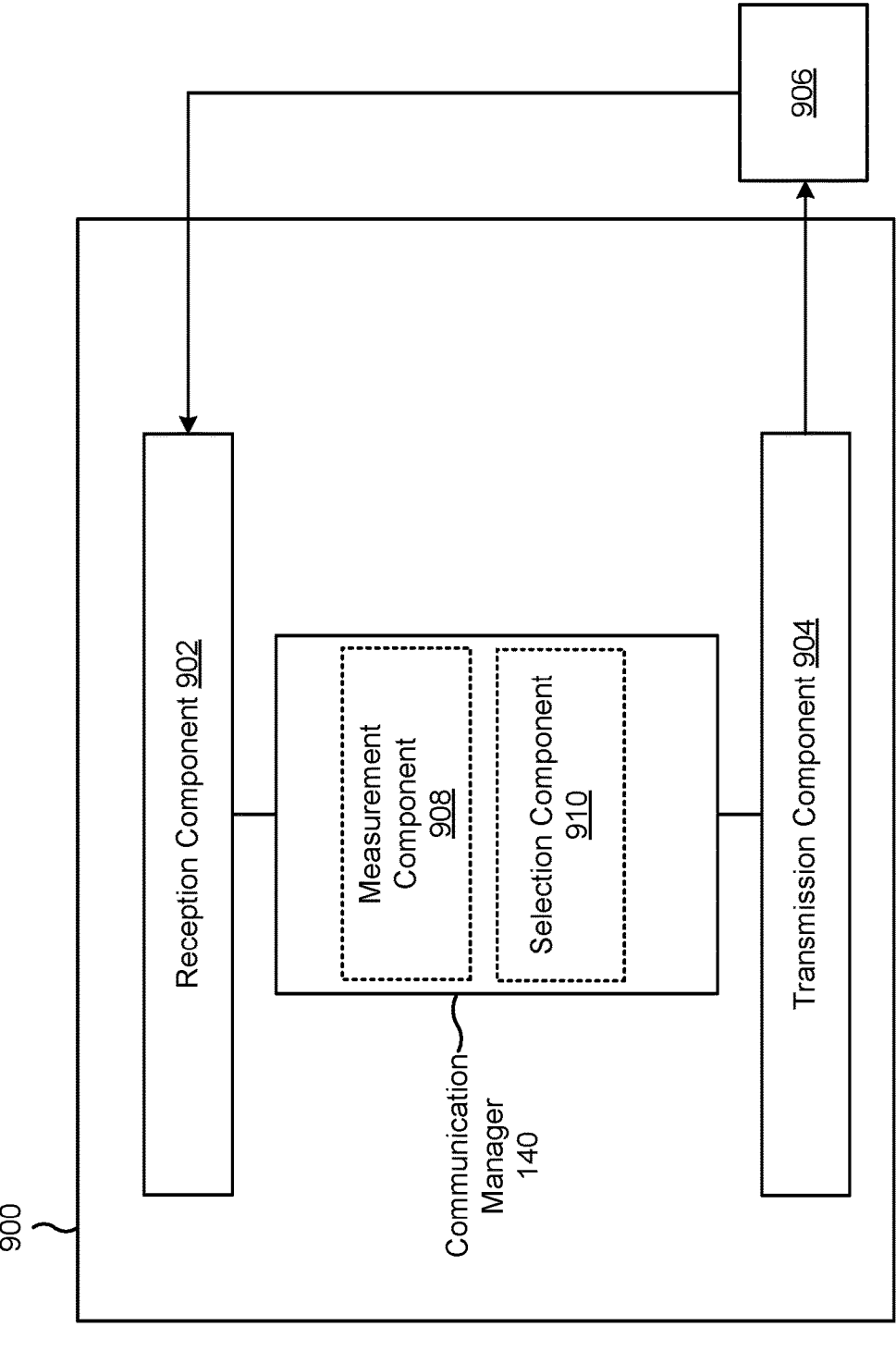
FIG. 9 is a diagram of an example apparatus for wireless communication that supports anchor cell management for an SSB-less carrier in accordance with the present disclosure.

FIG. 9 is a diagram of an example apparatus 900 for wireless communication that supports anchor cell management for an SSB-less carrier in accordance with the present disclosure. The apparatus 900 may be a UE, or a UE may include the apparatus 900. In some aspects, the apparatus 900 includes a reception component 902, a transmission component 904, and a communication manager 140, which may be in communication with one another (for example, via one or more buses). As shown, the apparatus 900 may communicate with another apparatus 906 (such as a UE, a network node, or another wireless communication device) using the reception component 902 and the transmission component 904.

In some aspects, the apparatus 900 may be configured to and/or operable to perform one or more operations described herein in connection with FIG. 5 and FIGS. 6A-6C. Additionally or alternatively, the apparatus 900 may be configured to and/or operable to perform one or more processes described herein, such as process 700 of FIG. 7. In some aspects, the apparatus 900 may include one or more components of the UE described above in connection with FIG. 2.

The reception component 902 may receive communications, such as reference signals, control information, and/or data communications, from the apparatus 906. The reception component 902 may provide received communications to one or more other components of the apparatus 900, such as the communication manager 140. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a modem, a demodulator, a MIMO detector, a receive processor, a controller/processor, and/or a memory of the UE described above in connection with FIG. 2.

The transmission component 904 may transmit communications, such as reference signals, control information, and/or data communications, to the apparatus 906. In some aspects, the communication manager 140 may generate communications and may transmit the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, and/or a memory of the UE described above in connection with FIG. 2. In some aspects, the transmission component 904 may be co-located with the reception component 902 in a transceiver.

The communication manager 140 may receive or may cause the reception component 902 to receive, from a network node, a configuration of an SSB-less SCell, the configuration indicating an anchor cell associated with the SSB-less SCell, the anchor cell being in a different frequency band than the SSB-less SCell. The communication manager 140 may receive or may cause the reception component 902 to receive, from the network node, an activation indication that activates the SSB-less SCell for the UE. The communication manager 140 may receive or may cause the reception component 902 to receive, via the anchor cell, a plurality of downlink reference signals. The communication manager 140 may transmit or may cause the transmission component 904 to transmit, to the network node, a measurement report indicating RSRP measurements for the plurality of downlink reference signals received via the anchor cell. In some aspects, the communication manager 140 may perform one or more operations described elsewhere herein as being performed by one or more components of the communication manager 140.

The communication manager 140 may include a controller/processor and/or a memory of the UE described above in connection with FIG. 2. In some aspects, the communication manager 140 includes a set of components, such as a measurement component 908, and/or a selection component 910. Alternatively, the set of components may be separate and distinct from the communication manager 140. In some aspects, one or more components of the set of components may include or may be implemented within a controller/processor and/or a memory of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive, from a network node, a configuration of an SSB-less SCell, the configuration indicating an anchor cell associated with the SSB-less SCell, the anchor cell being in a different frequency band than the SSB-less SCell. The reception component 902 may receive, from the network node, an activation indication that activates the SSB-less SCell for the UE. The reception component 902 may receive, via the anchor cell, a plurality of downlink reference signals. The transmission component 904 may transmit, to the network node, a measurement report indicating RSRP measurements for the plurality of downlink reference signals received via the anchor cell.

The reception component 902 may receive a downlink communication via the SSB-less SCell on a downlink beam based at least in part on the RSRP measurements for the plurality of downlink reference signals received via the anchor cell.

The reception component 902 may receive, in connection with the SSB-less SCell being an unknown cell, an indication, prior to the activation indication, to trigger the UE to receive the plurality of reference signals via the anchor cell and to perform and report the RSRP measurements for the plurality of downlink reference signals received via the anchor cell.

The measurement component 908 may perform periodic RSRP measurements for the plurality of downlink reference signals received via the anchor cell in connection with the SSB-less SCell being in an activated state.

The transmission component 904 may transmit periodic measurement reports respectively indicating respective periodic RSRP measurements for the plurality of downlink reference signals received via the anchor cell in connection with the SSB-less cell being in the activated state.

The reception component 902 may receive a deactivation indication indicating deactivation of the anchor cell.

The reception component 902 may receive, in connection with the deactivation of the anchor cell, an indication of another anchor cell associated with the SSB-less SCell.

The reception component 902 may receive a deactivation indication indicating deactivation of the anchor cell.

The reception component 902 may receive, in connection with the deactivation of the anchor cell, an indication to continue performing RSRP measurements for the plurality of downlink reference signals on the anchor cell while the anchor cell is in a deactivated state.

The reception component 902 may receive a deactivation indication indicating deactivation of the anchor cell.

The reception component 902 may receive, in connection with the deactivation of the anchor cell, an indication that SSB transmission is triggered for the SSB-less SCell, resulting in the SSB-less SCell becoming an SCell with SSB transmission.

The reception component 902 may receive an indication configuring the SCell with SSB transmission to be an anchor cell for one or more other SSB-less SCells.

The reception component 902 may receive a deactivation indication indicating deactivation of the anchor cell, wherein the SSB-less SCell is deactivated in connection with the deactivation of the anchor cell.

The reception component 902 may receive, in connection with the deactivation of the anchor cell, another deactivation indication indicating deactivation of the SSB-less SCell.

The reception component 902 may receive reconfiguration information indicating that the anchor cell is deconfigured for the UE.

The reception component 902 may receive, in connection with the anchor cell being deconfigured for the UE, an indication of another anchor cell associated with the SSB-less SCell.

The reception component 902 may receive reconfiguration information indicating that the anchor cell is deconfigured for the UE.

The reception component 902 may receive, in connection with the anchor cell being deconfigured for the UE, an indication that SSB transmission is triggered for the SSB-less SCell, resulting in the SSB-less SCell becoming an SCell with SSB transmission.

The reception component 902 may receive an indication configuring the SCell with SSB transmission to be an anchor cell for one or more other SSB-less SCells.

The reception component 902 may receive reconfiguration information indicating that the anchor cell is deconfigured for the UE.

The reception component 902 may receive, in connection with the anchor cell being deconfigured for the UE, reconfiguration information indicating deconfiguration of the SSB-less SCell for the UE.

The reception component 902 may receive an indication of a selection of the anchor cell from the plurality of candidate anchor cells.

The selection component 910 may select the anchor cell from the plurality of candidate anchor cells based at least in part on respective priority indexes associated with the plurality of candidate anchor cells.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
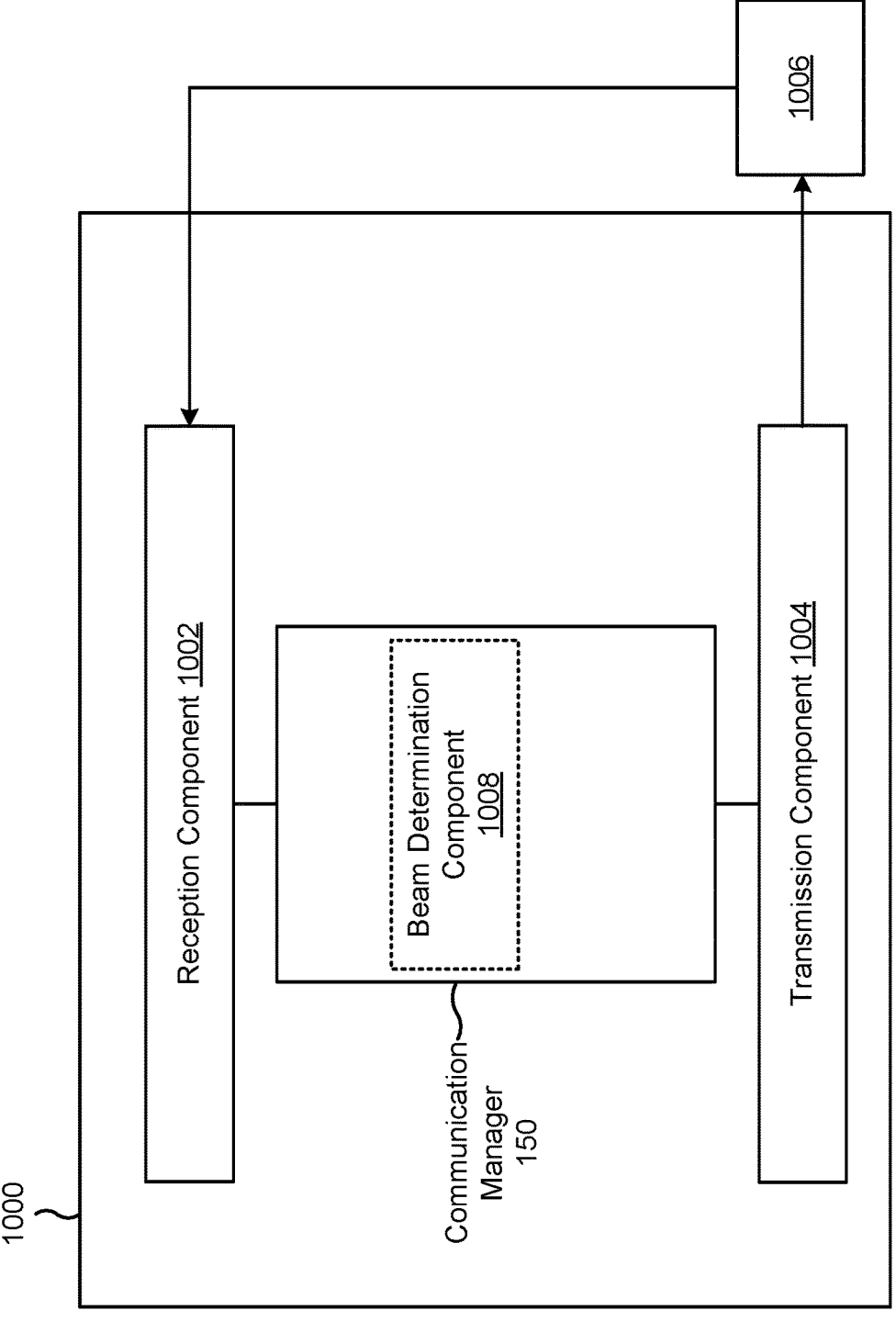
FIG. 10 is a diagram of an example apparatus for wireless communication that supports anchor cell management for an SSB-less carrier in accordance with the present disclosure.

FIG. 10 is a diagram of an example apparatus 1000 for wireless communication that supports anchor cell management for an SSB-less carrier in accordance with the present disclosure. The apparatus 1000 may be a network node, or a network node may include the apparatus 1000. In some aspects, the apparatus 1000 includes a reception component 1002, a transmission component 1004, and a communication manager 150, which may be in communication with one another (for example, via one or more buses). As shown, the apparatus 1000 may communicate with another apparatus 1006 (such as a UE, a network node, or another wireless communication device) using the reception component 1002 and the transmission component 1004.

In some aspects, the apparatus 1000 may be configured to and/or operable to perform one or more operations described herein in connection with FIG. 5 and FIGS. 6A-6C. Additionally or alternatively, the apparatus 1000 may be configured to and/or operable to perform one or more processes described herein, such as process 800 of FIG. 8. In some aspects, the apparatus 1000 may include one or more components of the network node described above in connection with FIG. 2.

The reception component 1002 may receive communications, such as reference signals, control information, and/or data communications, from the apparatus 1006. The reception component 1002 may provide received communications to one or more other components of the apparatus 1000, such as the communication manager 150. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a modem, a demodulator, a MIMO detector, a receive processor, a controller/processor, and/or a memory of the network node described above in connection with FIG. 2.

The transmission component 1004 may transmit communications, such as reference signals, control information, and/or data communications, to the apparatus 1006. In some aspects, the communication manager 150 may generate communications and may transmit the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, and/or a memory of the network node described above in connection with FIG. 2. In some aspects, the transmission component 1004 may be co-located with the reception component 1002 in a transceiver.

The communication manager 150 may transmit or may cause the transmission component 1004 to transmit a configuration of an SSB-less SCell for a UE, the configuration indicating an anchor cell associated with the SSB-less SCell, the anchor cell being in a different frequency band than the SSB-less SCell. The communication manager 150 may transmit or may cause the transmission component 1004 to transmit an activation indication that activates the SSB-less SCell for the UE. The communication manager 150 may transmit or may cause the transmission component 1004 to transmit, via the anchor cell, a plurality of downlink reference signals. The communication manager 150 may receive or may cause the reception component 1002 to receive a measurement report indicating RSRP measurements for the plurality of downlink reference signals transmitted via the anchor cell. In some aspects, the communication manager 150 may perform one or more operations described elsewhere herein as being performed by one or more components of the communication manager 150.

The communication manager 150 may include a controller/processor, a memory, a scheduler, and/or a communication unit of the network node described above in connection with FIG. 2. In some aspects, the communication manager 150 includes a set of components, such as a beam determination component 1008. Alternatively, the set of components may be separate and distinct from the communication manager 150. In some aspects, one or more components of the set of components may include or may be implemented within a controller/processor, a memory, a scheduler, and/or a communication unit of the network node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 1004 may transmit a configuration of an SSB-less SCell for a UE, the configuration indicating an anchor cell associated with the SSB-less SCell, the anchor cell being in a different frequency band than the SSB-less SCell. The transmission component 1004 may transmit an activation indication that activates the SSB-less SCell for the UE. The transmission component 1004 may transmit, via the anchor cell, a plurality of downlink reference signals. The reception component 1002 may receive a measurement report indicating RSRP measurements for the plurality of downlink reference signals transmitted via the anchor cell.

The transmission component 1004 may transmit a downlink communication via the SSB-less SCell on a downlink beam determined based at least in part on the RSRP measurements for the plurality of downlink reference signals transmitted via the anchor cell.

The beam determination component 1008 may determine the downlink beam for the downlink communication on the SSB-less SCell based at least in part on the RSRP measurements for the plurality of downlink reference signals transmitted via the anchor cell.

The transmission component 1004 may transmit, in connection with a determination that the SSB-less SCell is an unknown cell for the UE, an indication, prior to the activation indication, to trigger the UE to receive the plurality of reference signals transmitted via the anchor cell and to perform and report the RSRP measurements for the plurality of downlink reference signals transmitted via the anchor cell.

The transmission component 1004 may periodically transmit the plurality of downlink reference signals via the anchor cell in connection with the SSB-less SCell being in an activated state.

The reception component 1002 may receive periodic measurement reports respectively indicating respective periodic RSRP measurements for the plurality of downlink reference signals periodically transmitted via the anchor cell in connection with the SSB-less cell being in the activated state.

The transmission component 1004 may transmit a deactivation indication indicating deactivation of the anchor cell.

The transmission component 1004 may transmit, in connection with the deactivation of the anchor cell, an indication of another anchor cell associated with the SSB-less SCell.

The transmission component 1004 may transmit a deactivation indication indicating deactivation of the anchor cell.

The transmission component 1004 may transmit, in connection with the deactivation of the anchor cell, an indication for the UE to continue performing RSRP measurements for the plurality of downlink reference signals on the anchor cell while the anchor cell is in a deactivated state.

The transmission component 1004 may transmit a deactivation indication indicating deactivation of the anchor cell.

The transmission component 1004 may transmit, in connection with the deactivation of the anchor cell, an indication that SSB transmission is triggered for the SSB-less SCell, resulting in the SSB-less SCell becoming an SCell with SSB transmission.

The transmission component 1004 may transmit an indication configuring the SCell with SSB transmission to be an anchor cell for one or more other SSB-less SCells.

The transmission component 1004 may transmit a deactivation indication indicating deactivation of the anchor cell, wherein the SSB-less SCell is deactivated in connection with the deactivation of the anchor cell.

The transmission component 1004 may transmit, in connection with the deactivation of the anchor cell, another deactivation indication indicating deactivation of the SSB-less SCell.

The transmission component 1004 may transmit reconfiguration information indicating that the anchor cell is deconfigured for the UE.

The transmission component 1004 may transmit, in connection with the anchor cell being deconfigured for the UE, an indication of another anchor cell associated with the SSB-less SCell.

The transmission component 1004 may transmit reconfiguration information indicating that the anchor cell is deconfigured for the UE.

The transmission component 1004 may transmit, in connection with the anchor cell being deconfigured for the UE, an indication that SSB transmission is triggered for the SSB-less SCell, resulting in the SSB-less SCell becoming an SCell with SSB transmission.

The transmission component 1004 may transmit an indication configuring the SCell with SSB transmission to be an anchor cell for one or more other SSB-less SCells.

The transmission component 1004 may transmit reconfiguration information indicating that the anchor cell is deconfigured for the UE.

The transmission component 1004 may transmit, in connection with the anchor cell being deconfigured for the UE, reconfiguration information indicating deconfiguration of the SSB-less SCell for the UE.

The transmission component 1004 may transmit an indication of a selection of the anchor cell from the plurality of candidate anchor cells.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving, from a network node, a configuration of a synchronization signal block (SSB)-less secondary cell (SCell), the configuration indicating an anchor cell associated with the SSB-less SCell, the anchor cell being in a different frequency band than the SSB-less SCell; receiving, from the network node, an activation indication that activates the SSB-less SCell for the UE; receiving, via the anchor cell, a plurality of downlink reference signals; and transmitting, to the network node, a measurement report indicating reference signal received power (RSRP) measurements for the plurality of downlink reference signals received via the anchor cell.

Aspect 2: The method of Aspect 1, further comprising: receiving a downlink communication via the SSB-less SCell on a downlink beam based at least in part on the RSRP measurements for the plurality of downlink reference signals received via the anchor cell.

Aspect 3: The method of any of Aspects 1-2, wherein the anchor cell is a primary cell (PCell), a primary secondary cell (PSCell), an activated SCell, or a deactivated SCell in a cell group of the SSB-less SCell.

Aspect 4: The method of any of Aspects 1-3, wherein the activation indication indicates an aperiodic tracking reference signal (TRS) for initialization of automatic gain control (AGC), a frequency tracking loop (FTL), and a time tracking loop (TTL) on the SSB-less SCell.

Aspect 5: The method of any of Aspects 1-4, wherein the SSB-less SCell is a known cell for the UE based at least in part on the RSRP measurements for the plurality of downlink reference signals received via the anchor cell being reported within a time window preceding a time associated with activation of the SSB-less SCell, or wherein the SSB-less SCell is an unknown cell for the UE based at least in part on the RSRP measurements for the plurality of downlink reference signals on the anchor cell not being reported within a time window preceding a time associated with activation of the SSB-less SCell.

Aspect 6: The method of Aspect 5, further comprising: receiving, in connection with the SSB-less SCell being an unknown cell, an indication, prior to the activation indication, to trigger the UE to receive the plurality of reference signals via the anchor cell and to perform and report the RSRP measurements for the plurality of downlink reference signals received via the anchor cell.

Aspect 7: The method of any of Aspects 1-6, further comprising: performing periodic RSRP measurements for the plurality of downlink reference signals received via the anchor cell in connection with the SSB-less SCell being in an activated state; transmitting periodic measurement reports respectively indicating respective periodic RSRP measurements for the plurality of downlink reference signals received via the anchor cell in connection with the SSB-less cell being in the activated state.

Aspect 8: The method of any of Aspects 1-7, wherein the anchor cell is associated with a plurality of SSB-less SCells including the SSB-less SCell, and wherein the method further comprises: performing periodic RSRP measurements for the plurality of downlink reference signals received via the anchor cell in connection with at least one SSB-less cell of the plurality of SSB-less SCells being in an activated state; transmitting periodic measurement reports respectively indicating respective periodic RSRP measurements for the plurality of downlink reference signals received via the anchor cell in connection with at least one SSB-less cell of the plurality of SSB-less SCells being in the activated state.

Aspect 9: The method of any of Aspects 1-8, further comprising: receiving a deactivation indication indicating deactivation of the anchor cell; and receiving, in connection with the deactivation of the anchor cell, an indication of another anchor cell associated with the SSB-less SCell.

Aspect 10: The method of any of Aspects 1-8, further comprising: receiving a deactivation indication indicating deactivation of the anchor cell; and receiving, in connection with the deactivation of the anchor cell, an indication to continue performing RSRP measurements for the plurality of downlink reference signals on the anchor cell while the anchor cell is in a deactivated state.

Aspect 11: The method of any of Aspects 1-8, further comprising: receiving a deactivation indication indicating deactivation of the anchor cell; and receiving, in connection with the deactivation of the anchor cell, an indication that SSB transmission is triggered for the SSB-less SCell, resulting in the SSB-less SCell becoming an SCell with SSB transmission.

Aspect 12: The method of Aspect 11, further comprising: receiving an indication configuring the SCell with SSB transmission to be an anchor cell for one or more other SSB-less SCells.

Aspect 13: The method of any of Aspects 1-8, further comprising: receiving a deactivation indication indicating deactivation of the anchor cell, wherein the SSB-less SCell is deactivated in connection with the deactivation of the anchor cell.

Aspect 14: The method of Aspect 13, further comprising: receiving, in connection with the deactivation of the anchor cell, another deactivation indication indicating deactivation of the SSB-less SCell.

Aspect 15: The method of any of Aspects 1-14, further comprising: receiving reconfiguration information indicating that the anchor cell is deconfigured for the UE; and receiving, in connection with the anchor cell being deconfigured for the UE, an indication of another anchor cell associated with the SSB-less SCell.

Aspect 16: The method of any of Aspects 1-14, further comprising: receiving reconfiguration information indicating that the anchor cell is deconfigured for the UE; and receiving, in connection with the anchor cell being deconfigured for the UE, an indication that SSB transmission is triggered for the SSB-less SCell, resulting in the SSB-less SCell becoming an SCell with SSB transmission.

Aspect 17: The method of Aspect 16, further comprising: receiving an indication configuring the SCell with SSB transmission to be an anchor cell for one or more other SSB-less SCells.

Aspect 18: The method of any of Aspects 1-14, further comprising: receiving reconfiguration information indicating that the anchor cell is deconfigured for the UE; and receiving, in connection with the anchor cell being deconfigured for the UE, reconfiguration information indicating deconfiguration of the SSB-less SCell for the UE.

Aspect 19: The method of any of Aspects 1-18, wherein the configuration indicates a plurality of candidate anchor cells, including the anchor cell, associated with the SSB-less SCell.

Aspect 20: The method of Aspect 19, further comprising: receiving an indication of a selection of the anchor cell from the plurality of candidate anchor cells.

Aspect 21: The method of Aspect 19, further comprising: selecting the anchor cell from the plurality of candidate anchor cells based at least in part on respective priority indexes associated with the plurality of candidate anchor cells.

Aspect 22: The method of Aspect 21, wherein selecting the anchor cell from the plurality of candidate anchor cells based at least in part on respective priority indexes associated with the plurality of candidate anchor cells comprises: selecting, in connection with one or more of the plurality of candidate anchor cells being activated, the anchor cell from the plurality of candidate anchor cells based at least in part on the anchor cell being an activated anchor cell with a highest priority index; or selecting, in connection with all of the plurality of candidate anchor cells being deactivated, the anchor cell from the plurality of candidate anchor cells based at least in part on the anchor cell being a deactivated anchor cell with a highest priority index.

Aspect 23: A method of wireless communication performed by a network node, comprising: transmitting a configuration of a synchronization signal block (SSB)-less secondary cell (SCell) for a user equipment (UE), the configuration indicating an anchor cell associated with the SSB-less SCell, the anchor cell being in a different frequency band than the SSB-less SCell; transmitting an activation indication that activates the SSB-less SCell for the UE; transmitting, via the anchor cell, a plurality of downlink reference signals; and receiving a measurement report indicating reference signal received power (RSRP) measurements for the plurality of downlink reference signals transmitted via the anchor cell.

Aspect 24: The method of Aspect 23, further comprising: transmitting a downlink communication via the SSB-less SCell on a downlink beam determined based at least in part on the RSRP measurements for the plurality of downlink reference signals transmitted via the anchor cell.

Aspect 25: The method of any of Aspects 23-24, wherein the anchor cell is a primary cell (PCell), a primary secondary cell (PSCell), an activated SCell, or a deactivated SCell in a cell group of the SSB-less SCell.

Aspect 26: The method of any of Aspects 23-25, wherein the activation indication indicates an aperiodic tracking reference signal (TRS) for initialization of automatic gain control (AGC), a frequency tracking loop (FTL), and a time tracking loop (TTL) on the SSB-less SCell.

Aspect 27: The method of any of Aspects 23-26, wherein the SSB-less SCell is a known cell for the UE based at least in part on the RSRP measurements for the plurality of downlink reference signals transmitted via the anchor cell being reported within a time window preceding a time associated with activation of the SSB-less SCell, or wherein the SSB-less SCell is an unknown cell for the UE based at least in part on the RSRP measurements for the plurality of downlink reference signals transmitted via the anchor cell not being reported within a time window preceding a time associated with activation of the SSB-less SCell.

Aspect 28: The method of Aspect 27, further comprising: transmitting, in connection with a determination that the SSB-less SCell is an unknown cell for the UE, an indication, prior to the activation indication, to trigger the UE to receive the plurality of reference signals transmitted via the anchor cell and to perform and report the RSRP measurements for the plurality of downlink reference signals transmitted via the anchor cell.

Aspect 29: The method of any of Aspects 23-28, further comprising: periodically transmitting the plurality of downlink reference signals via the anchor cell in connection with the SSB-less SCell being in an activated state; receiving periodic measurement reports respectively indicating respective periodic RSRP measurements for the plurality of downlink reference signals periodically transmitted via the anchor cell in connection with the SSB-less cell being in the activated state.

Aspect 30: The method of any of Aspects 23-29, wherein the anchor cell is associated with a plurality of SSB-less SCells including the SSB-less SCell, and wherein the method further comprises: periodically transmitting the plurality of downlink reference signals via the anchor cell in connection with at least one SSB-less cell of the plurality of SSB-less SCells being in an activated state; receiving periodic measurement reports respectively indicating respective periodic RSRP measurements for the plurality of downlink reference signals periodically transmitted via the anchor cell in connection with at least one SSB-less cell of the plurality of SSB-less SCells being in the activated state.

Aspect 31: The method of any of Aspects 23-30, further comprising: transmitting a deactivation indication indicating deactivation of the anchor cell; and transmitting, in connection with the deactivation of the anchor cell, an indication of another anchor cell associated with the SSB-less SCell.

Aspect 32: The method of any of Aspects 23-30, further comprising: transmitting a deactivation indication indicating deactivation of the anchor cell; and transmitting, in connection with the deactivation of the anchor cell, an indication for the UE to continue performing RSRP measurements for the plurality of downlink reference signals on the anchor cell while the anchor cell is in a deactivated state.

Aspect 33: The method of any of Aspects 23-30, further comprising: transmitting a deactivation indication indicating deactivation of the anchor cell; and transmitting, in connection with the deactivation of the anchor cell, an indication that SSB transmission is triggered for the SSB-less SCell, resulting in the SSB-less SCell becoming an SCell with SSB transmission.

Aspect 34: The method of Aspect 33, further comprising: transmitting an indication configuring the SCell with SSB transmission to be an anchor cell for one or more other SSB-less SCells.

Aspect 35: The method of any of Aspects 23-30, further comprising: transmitting a deactivation indication indicating deactivation of the anchor cell, wherein the SSB-less SCell is deactivated in connection with the deactivation of the anchor cell.

Aspect 36: The method of Aspect 35, further comprising: transmitting, in connection with the deactivation of the anchor cell, another deactivation indication indicating deactivation of the SSB-less SCell.

Aspect 37: The method of any of Aspects 23-36, further comprising: transmitting reconfiguration information indicating that the anchor cell is deconfigured for the UE; and transmitting, in connection with the anchor cell being deconfigured for the UE, an indication of another anchor cell associated with the SSB-less SCell.

Aspect 38: The method of any of Aspects 23-36, further comprising: transmitting reconfiguration information indicating that the anchor cell is deconfigured for the UE; and transmitting, in connection with the anchor cell being deconfigured for the UE, an indication that SSB transmission is triggered for the SSB-less SCell, resulting in the SSB-less SCell becoming an SCell with SSB transmission.

Aspect 39: The method of Aspect 38, further comprising: transmitting an indication configuring the SCell with SSB transmission to be an anchor cell for one or more other SSB-less SCells.

Aspect 40: The method of any of Aspects 23-36, further comprising: transmitting reconfiguration information indicating that the anchor cell is deconfigured for the UE; and transmitting, in connection with the anchor cell being deconfigured for the UE, reconfiguration information indicating deconfiguration of the SSB-less SCell for the UE.

Aspect 41: The method of any of Aspects 23-40, wherein the configuration indicates a plurality of candidate anchor cells, including the anchor cell, associated with the SSB-less SCell.

Aspect 42: The method of Aspect 41, further comprising: transmitting an indication of a selection of the anchor cell from the plurality of candidate anchor cells.

Aspect 43: An apparatus for wireless communication at a device, comprising a processor; memory coupled with the processor; and instructions stored in the memory and executable by the processor to cause the apparatus to perform the method of one or more of Aspects 1-42.

Aspect 44: A device for wireless communication, comprising a memory and one or more processors coupled to the memory, the one or more processors configured to perform the method of one or more of Aspects 1-42.

Aspect 45: An apparatus for wireless communication, comprising at least one means for performing the method of one or more of Aspects 1-42.

Aspect 46: A non-transitory computer-readable medium storing code for wireless communication, the code comprising instructions executable by a processor to perform the method of one or more of Aspects 1-42.

Aspect 47: A non-transitory computer-readable medium storing a set of instructions for wireless communication, the set of instructions comprising one or more instructions that, when executed by one or more processors of a device, cause the device to perform the method of one or more of Aspects 1-42.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:

at least one memory; and at least one processor communicatively coupled with the at least one memory, the at least one processor operable to cause the UE to:

receive, from a network node, a configuration of a synchronization signal block (SSB)-less secondary cell (SCell), the configuration indicating an anchor cell associated with the SSB-less SCell, the anchor cell being in a different frequency band than the SSB-less SCell, and the anchor cell being a cell to be used for downlink beam management of the SSB-less SCell when the SSB-less SCell is activated;

receive, from the network node, an activation indication that activates the SSB-less SCell for the UE;

receive, via the anchor cell, a plurality of downlink reference signals; and transmit, to the network node, a measurement report indicating reference signal received power (RSRP) measurements for the plurality of downlink reference signals received via the anchor cell.

2. The UE of claim 1, wherein the at least one processor is further operable to cause the UE to:

receive a downlink communication via the SSB-less SCell on a downlink beam based at least in part on the RSRP measurements for the plurality of downlink reference signals received via the anchor cell.

3. The UE of claim 1, wherein the anchor cell is a primary cell (PCell), a primary secondary cell (PSCell), an activated SCell, or a deactivated SCell in a cell group of the SSB-less SCell.

4. The UE of claim 1, wherein the activation indication indicates an aperiodic tracking reference signal (TRS) for initialization of automatic gain control (AGC), a frequency tracking loop (FTL), and a time tracking loop (TTL) on the SSB-less SCell.

5. The UE of claim 1, wherein the SSB-less SCell is a known cell for the UE based at least in part on the RSRP measurements for the plurality of downlink reference signals received via the anchor cell being reported within a time window preceding a time associated with activation of the SSB-less SCell, or wherein the SSB-less SCell is an unknown cell for the UE based at least in part on the RSRP measurements for the plurality of downlink reference signals on the anchor cell not being reported within a time window preceding a time associated with activation of the SSB-less SCell.

6. The UE of claim 5, wherein the at least one processor is further operable to cause the UE to:

receive, in connection with the SSB-less SCell being an unknown cell, an indication, prior to the activation indication, to trigger the UE to receive the plurality of downlink reference signals via the anchor cell and to perform and report the RSRP measurements for the plurality of downlink reference signals received via the anchor cell.

7. The UE of claim 1, wherein the at least one processor is further operable to cause the UE to:

perform periodic RSRP measurements for the plurality of downlink reference signals received via the anchor cell in connection with the SSB-less SCell being in an activated state; and transmit periodic measurement reports respectively indicating respective periodic RSRP measurements for the plurality of downlink reference signals received via the anchor cell in connection with the SSB-less SCell being in the activated state.

8. The UE of claim 1, wherein the anchor cell is associated with a plurality of SSB-less SCells including the SSB-less SCell, and wherein the at least one processor is further operable to cause the UE to:

perform periodic RSRP measurements for the plurality of downlink reference signals received via the anchor cell in connection with at least one SSB-less cell of the plurality of SSB-less SCells being in an activated state; and transmit periodic measurement reports respectively indicating respective periodic RSRP measurements for the plurality of downlink reference signals received via the anchor cell in connection with at least one SSB-less cell of the plurality of SSB-less SCells being in the activated state.

9. The UE of claim 1, wherein the at least one processor is further operable to cause the UE to:

receive a deactivation indication indicating deactivation of the anchor cell; and receive, in connection with the deactivation of the anchor cell, an indication of another anchor cell associated with the SSB-less SCell.

10. The UE of claim 1, wherein the at least one processor is further operable to cause the UE to:

receive a deactivation indication indicating deactivation of the anchor cell; and receive, in connection with the deactivation of the anchor cell, an indication to continue performing RSRP measurements for the plurality of downlink reference signals on the anchor cell while the anchor cell is in a deactivated state.

11. The UE of claim 1, wherein the at least one processor is further operable to cause the UE to:

receive a deactivation indication indicating deactivation of the anchor cell; and receive, in connection with the deactivation of the anchor cell, an indication that SSB transmission is triggered for the SSB-less SCell, resulting in the SSB-less SCell becoming an SCell with SSB transmission.

12. The UE of claim 11, wherein the at least one processor is further operable to cause the UE to:

receive an indication configuring the SCell with SSB transmission to be an anchor cell for one or more other SSB-less SCells.

13. The UE of claim 1, wherein the at least one processor is further operable to cause the UE to:

receive a deactivation indication indicating deactivation of the anchor cell, wherein the SSB-less SCell is deactivated in connection with the deactivation of the anchor cell.

14. The UE of claim 13, wherein the at least one processor is further operable to cause the UE to:

receive, in connection with the deactivation of the anchor cell, another deactivation indication indicating deactivation of the SSB-less SCell.

15. The UE of claim 1, wherein the at least one processor is further operable to cause the UE to:

receive reconfiguration information indicating that the anchor cell is deconfigured for the UE; and receive, in connection with the anchor cell being deconfigured for the UE, an indication of another anchor cell associated with the SSB-less SCell.

16. The UE of claim 1, wherein the at least one processor is further operable to cause the UE to:

receive reconfiguration information indicating that the anchor cell is deconfigured for the UE; and receive, in connection with the anchor cell being deconfigured for the UE, an indication that SSB transmission is triggered for the SSB-less SCell, resulting in the SSB-less SCell becoming an SCell with SSB transmission.

17. The UE of claim 16, wherein the at least one processor is further operable to cause the UE to:

receive an indication configuring the SCell with SSB transmission to be an anchor cell for one or more other SSB-less SCells.

18. The UE of claim 1, wherein the at least one processor is further operable to cause the UE to:

receive reconfiguration information indicating that the anchor cell is deconfigured for the UE; and receive, in connection with the anchor cell being deconfigured for the UE, reconfiguration information indicating deconfiguration of the SSB-less SCell for the UE.

19. The UE of claim 1, wherein the configuration indicates a plurality of candidate anchor cells, including the anchor cell, associated with the SSB-less SCell.

20. The UE of claim 19, wherein the at least one processor is further operable to cause the UE to:

receive an indication of a selection of the anchor cell from the plurality of candidate anchor cells.

21. The UE of claim 19, wherein the at least one processor is further operable to cause the UE to:

select the anchor cell from the plurality of candidate anchor cells based at least in part on respective priority indexes associated with the plurality of candidate anchor cells.

22. The UE of claim 21, wherein, to cause the UE to select the anchor cell from the plurality of candidate anchor cells based at least in part on respective priority indexes associated with the plurality of candidate anchor cells, the at least one processor is operable to cause the UE to:

select, in connection with one or more of the plurality of candidate anchor cells being activated, the anchor cell from the plurality of candidate anchor cells based at least in part on the anchor cell being an activated anchor cell with a highest priority index; or select, in connection with all of the plurality of candidate anchor cells being deactivated, the anchor cell from the plurality of candidate anchor cells based at least in part on the anchor cell being a deactivated anchor cell with a highest priority index.

23. A network node for wireless communication, comprising:

at least one memory; and at least one processor communicatively coupled with the at least one memory, the at least one processor operable to cause the network node to:

transmit a configuration of a synchronization signal block (SSB)-less secondary cell (SCell) for a user equipment (UE), the configuration indicating an anchor cell associated with the SSB-less SCell, the anchor cell being in a different frequency band than the SSB-less SCell, and the anchor cell being a cell to be used for downlink beam management of the SSB-less SCell when the SSB-less SCell is activated;

transmit an activation indication that activates the SSB-less SCell for the UE;

transmit, via the anchor cell, a plurality of downlink reference signals; and receive a measurement report indicating reference signal received power (RSRP) measurements for the plurality of downlink reference signals transmitted via the anchor cell.

24. The network node of claim 23, wherein the at least one processor is further operable to cause the network node to:

transmit a downlink communication via the SSB-less SCell on a downlink beam determined based at least in part on the RSRP measurements for the plurality of downlink reference signals transmitted via the anchor cell.

25. The network node of claim 23, wherein the activation indication indicates an aperiodic tracking reference signal (TRS) for initialization of automatic gain control (AGC), a frequency tracking loop (FTL), and a time tracking loop (TTL) on the SSB-less SCell.

26. The network node of claim 23, wherein the SSB-less SCell is a known cell for the UE based at least in part on the RSRP measurements for the plurality of downlink reference signals transmitted via the anchor cell being reported within a time window preceding a time associated with activation of the SSB-less SCell, or wherein the SSB-less SCell is an unknown cell for the UE based at least in part on the RSRP measurements for the plurality of downlink reference signals transmitted via the anchor cell not being reported within a time window preceding a time associated with activation of the SSB-less SCell.

27. The network node of claim 26, wherein the at least one processor is further operable to cause the network node to:

transmit, in connection with a determination that the SSB-less SCell is an unknown cell for the UE, an indication, prior to the activation indication, to trigger the UE to receive the plurality of downlink reference signals transmitted via the anchor cell and to perform and report the RSRP measurements for the plurality of downlink reference signals transmitted via the anchor cell.

28. A method of wireless communication performed by a user equipment (UE), comprising:

receiving, from a network node, a configuration of a synchronization signal block (SSB)-less secondary cell (SCell), the configuration indicating an anchor cell associated with the SSB-less SCell, the anchor cell being in a different frequency band than the SSB-less SCell, and the anchor cell being a cell to be used for downlink beam management of the SSB-less SCell when the SSB-less SCell is activated;

receiving, from the network node, an activation indication that activates the SSB-less SCell for the UE;

receiving, via the anchor cell, a plurality of downlink reference signals; and transmitting, to the network node, a measurement report indicating reference signal received power (RSRP) measurements for the plurality of downlink reference signals received via the anchor cell.

29. The method of claim 28, further comprising:

receiving a downlink communication via the SSB-less SCell on a downlink beam based at least in part on the RSRP measurements for the plurality of downlink reference signals received via the anchor cell.

30. A method of wireless communication performed by a network node, comprising:

transmitting a configuration of a synchronization signal block (SSB)-less secondary cell (SCell) for a user equipment (UE), the configuration indicating an anchor cell associated with the SSB-less SCell, the anchor cell being in a different frequency band than the SSB-less SCell, and the anchor cell being a cell to be used for downlink beam management of the SSB-less SCell when the SSB-less SCell is activated;

transmitting an activation indication that activates the SSB-less SCell for the UE;

transmitting, via the anchor cell, a plurality of downlink reference signals; and receiving a measurement report indicating reference signal received power (RSRP) measurements for the plurality of downlink reference signals transmitted via the anchor cell.

* * * * *